(12) United States Patent
Takatsuka et al.

(10) Patent No.: US 7,388,574 B2
(45) Date of Patent: Jun. 17, 2008

(54) POINTING DEVICE

(75) Inventors: Toshinori Takatsuka, Fuji (JP);
Kazutoshi Ishibashi, Fuji (JP);
Masataka Yamashita, Kawasaki (JP)

(73) Assignee: Asahi Kasei EMD Corporation, Tokyo (JP)

( * ) Notice: Subject to any disclaimer, the term of this patent is extended or adjusted under 35 U.S.C. 154(b) by 648 days.

(21) Appl. No.: 10/686,565

(22) Filed: Oct. 17, 2003

(65) Prior Publication Data

US 2004/0080491 A1 Apr. 29, 2004

Related U.S. Application Data

(63) Continuation of application No. PCT/JP02/03918, filed on Apr. 19, 2002.

(30) Foreign Application Priority Data

| Apr. 19, 2001 | (JP) | 2001-121483 |
| Oct. 12, 2001 | (JP) | 2001-315832 |
| Nov. 5, 2001 | (JP) | 2001-339590 |

(51) Int. Cl.
*G09G 5/00* (2006.01)

(52) U.S. Cl. .......... 345/156; 345/159; 345/161; 345/168

(58) Field of Classification Search .......... 345/156, 345/157, 159, 161, 168
See application file for complete search history.

(56) References Cited

U.S. PATENT DOCUMENTS 5,179,460 A * 1/1993 Hinata et al. ........ 349/149
5,504,502 A * 4/1996 Arita et al. .......... 345/160
5,565,632 A * 10/1996 Ogawa ............. 73/862.69
5,973,668 A 10/1999 Watanabe
6,373,265 B1 4/2002 Moriomoto et al.

(Continued)

FOREIGN PATENT DOCUMENTS

JP 04-125723 4/1992

(Continued)

OTHER PUBLICATIONS

European Patent Office Search Report, Nov. 23, 2005, European Application No. 02718620.4-2211 PCT, 3 pgs.

(Continued)

*Primary Examiner*—Richard Hjerpe
*Assistant Examiner*—Leonid Shapiro
(74) *Attorney, Agent, or Firm*—Finnegan, Henderson, Farabow, Garrett & Dunner, LLP

(57) ABSTRACT

A pointing device is provided which facilitates the assembly, achieves downsizing and has a long life. Magnetic sensors 21 are placed symmetrically two by two along an X axis and Y axis on a printed circuit board 24. A switch 28 is placed on a silicone resin 23 side surface of the printed circuit board 24 to provide a switch function achieved by depressing a magnet cover 25 toward the magnet 22. The pointing device, a device for outputting coordinate values of an input point, can not only output the coordinate values, but also make a decision by the switch function. A silicone resin 23 is easy to deform caused by an external force, and returns its initial state without the applied external force as soon as the external force is removed.

22 Claims, 31 Drawing Sheets

U.S. PATENT DOCUMENTS 6,670,946 B2 * 12/2003 Endo et al. .................. 345/160

FOREIGN PATENT DOCUMENTS

| | | |
|---|---|---|
| JP | 4-172521 | 6/1992 |
| JP | 6-35599 | 2/1994 |
| JP | 6-318134 | 11/1994 |
| JP | 8-152961 | 6/1996 |
| JP | 9-34644 | 2/1997 |
| JP | 9-128139 | 5/1997 |
| JP | 9-265347 | 10/1997 |
| JP | 2000-193538 | 7/2000 |
| JP | 2000-292271 | 10/2000 |
| JP | 2001-027570 | 1/2001 |
| WO | WO 02/086694 A1 | 10/2002 |

OTHER PUBLICATIONS

Official Notice of Rejection mailed May 22, 2007 from the Japanese Patent Office.

* cited by examiner

POINTING DEVICE

This application claims priority from Japanese Patent Application Nos. 2001-121483, 2001-315832 and 2001-339590 filed Apr. 19, 2001, Oct. 12, 2001 and Nov. 5, 2001, respectively, which are incorporated hereinto by reference. In addition, this application is a continuation application of International Application No. PCT/JP02/03918 filed Apr. 19, 2002 designating the U.S.

BACKGROUND OF THE INVENTION

1. Field of the Invention

The present invention relates to a pointing device used as an input device of a personal computer or mobile phone, and more particularly to a magnetic detecting type pointing device for inputting coordinate detection information or vector information by detecting ambient magnetic field changes caused by in the movement of a magnet. In addition, it relates to a magnetic sensor array suitable for these pointing devices, and to a pointing device manipulation adapter.

2. Description of the Related Art

FIG. 4 is a block diagram showing a magnetic detecting circuit of a conventional magnetic detecting type pointing device. In FIG. 4, a detecting section 1 includes four magnetic sensors (such as Hall effect devices, semiconductor magnetoresistive elements, ferro-magnetic magnetoresistive elements, GMR devices) 11. The four Hall effect devices 11 are placed symmetrically two by two along the X and Y axes. A magnet is disposed close to the center of the four Hall effect devices symmetrically placed on the X and Y axes. The output voltages of the Hall effect devices 11 vary in response to the changes in the magnetic field caused by a movement of the magnet. Differential amplifiers 2 differentially amplify the outputs of the Hall effect devices 11 on the X axis and Y axis, respectively. They are preset such that their outputs become zero when the magnetic field in the Z axis direction is symmetric with respect to the origin O, that is, when the magnetization direction of the magnet is in the vertical direction. The system is configured such that the differential amplifiers 2 generate outputs in response to the movement of the magnet, and that a detection controller 3 converts the outputs (analog values) to an X coordinate value and Y coordinate value, and an output controller 4 outputs them.

Preferably, the magnet is disposed in such a manner that its magnetization axis coincides with the centerline of the Hall effect device array, that is, with the symmetry line, and a reference position is determined such that the magnetic flux density becomes symmetric with respect to the centerline of the Hall effect device array. In this case, since the Hall effect devices, which are placed at the position symmetric with respect to the centerline, generate the differential outputs, the differential output becomes zero at the reference position in an ideal case where the Hall effect devices have no variations or error in performance.

As the magnet moves, the differential amplifiers 2 produce their outputs in response to the movement. The detection controller 3 converts the outputs (analog values) to the X coordinate value and Y coordinate value, and the output controller 4 outputs them. It is not always necessary for the outputs at the reference position to be zero. An accurate displacement can be obtained by detecting the difference of the differential outputs of the Hall effect devices corresponding to the disposition of the magnet with reference to their differential outputs at the reference position.

As an example of a support structure enabling the movement of the magnet, a construction as shown in FIG. 5 has been proposed. It is configured such that a coiled spring 34 supports a magnet 32 at its end, and that magnetic sensors 31, which are disposed on a printed circuit board on which the coiled spring 34 is mounted, detect the movement of the magnet 32.

Another support structure of the magnet is configured as shown in FIG. 6. It includes a magnet case 45 containing a magnet 42, a coiled spring 44 attached to an end of the magnet case 45 via a coiled spring holder 46, and a magnet actuator 47 for supporting the coiled spring 44.

An ordinary touch type pointing device is configured such that two sets of comb-like electrodes are formed on a printed circuit board, and a conductive rubber is pressed thereon to vary the conducting state, and to output the coordinate values as digital values.

However, a problem common to these magnet support structures of the magnetic detecting type pointing devices is that they require not only the magnet, but also a variety of other components such as a coiled spring or magnet case. In particular, using the coiled spring presents a problem such as positioning the magnet at the origin in the assembly. In addition, they have a problem of hindering the size reduction of the pointing devices because the support structures are considerably greater than the magnet itself.

In summary, the conventional techniques have problems of requiring a complicated magnet support structure to support the magnet thereon, and of being difficult to assemble them and to downsize them. Furthermore, as for the touch type pointing device, since the conductive rubber is pressed every time the input is made, it is unavoidable that the repeated input can impair the conductive rubber, thereby reducing its life.

Japanese patent Application publication No. 7-117876 (1995) discloses a pointing control device for moving a pointer or cursor on a computer display to a desired position on the display. The pointing control device has its slider be moved along a dome, and has magnetic sensors detect magnetic flux changes from a magnet attached to the slider.

However, this type of the pointing device has a problem of being it difficult to form a thin-structure because the magnet is inclined along the dome, thereby leaving room for improvement in the thin-structure of the device and in the ease of operation. In addition, it has been desired to develop a manipulation adapter for making the operation of the pointing device easier.

The present invention is implemented to solve these problems. Therefore an object of the present invention is to provide a pointing device capable of facilitating the assembly, downsizing and prolonging the life.

Another object of the present invention is to provide a pointing device with a high degree of ease of use, which has a thin-structure and generates a large output in case of using a magnet with a small magnetic force.

Still another object of the present invention is to provide a pointing device with a high degree of ease of use, which has a thin-walled structure and hence enables a large output using a magnet with a small magnetic force by using a magnetic sensor array, and its magnetic sensors capable of automatically aligning an initial position of the magnet used as a position input of the pointing device.

Another object of the present invention is to provide a pointing device manipulation adapter with a high degree of ease of use, which generates a large output in case of using a magnet with a small magnetic force.

DISCLOSURE OF THE INVENTION

To accomplish the foregoing objects, according to an aspect of the present invention, there is provided a pointing device comprising: a printed circuit board; a resin layer on the printed circuit board; a magnet placed on and protruding from the resin layer; and a plurality of magnetic sensors attached to the printed circuit board, for detecting ambient magnetic flux density changes caused by displacement or inclination of the magnet, wherein the pointing device outputs coordinate values of an input point.

As the magnetic sensors, a variety of magnetic sensors are applicable such as Hall effect devices, Hall ICs, magnetoresistive elements (MR elements), magnetoresistive ICs (MRIC), reed switches. For an analog output pointing device, analog output magnetic sensors are preferable, and for a digital output pointing device, digital output magnetic sensors are preferable.

The pointing device may further comprise a switch on a resin side surface of the printed circuit board. It may further comprise a protrusion formed on the resin layer and facing the switch, to depress the switch. Although any switches including pushbutton switches can be used as the switch, those switches are appropriate: a tactile switch that enables a user to confirm the depression (with providing a feeling of a click) and automatically returns to a normal position after pushing the switch; or a switch that checks a target object by making use of physical contact with it such as a tact switch, touch switch, and stroke switch.

As for the magnet, there is no restrictive condition on its type: a variety of commonly mass-produced magnets are applicable such as ferrite magnets, samarium-cobalt magnets, neodymium magnets. To achieve downsizing of the pointing device, the downsizing of the magnet is essential. Accordingly, it is preferable to use a samarium-cobalt magnets or neodymium magnets that can generate intense magnetic field even though small in size.

The magnet and resin may be replaced by a rubber magnet. As for the rubber magnet, there is no restrictive condition on its type: a variety of commonly mass-produced rubber magnets are applicable such as a ferrite group rubber magnets, neodymium rubber magnets, and plastic magnets. To reduce the thickness of the pointing device, it is essential to reduce that of the magnet. Accordingly, a neodymium group plastic magnet is preferable that can generate intense magnetic field even though small in size.

As the resin layer, an elastic resin is preferable. As for the elastic resin, although there is no restrictive condition on its type, a silicone resin, which has a wide variety of applications, is preferable because it is low cost and easily available.

It is preferable that the resin layer and printed circuit board do not have their opposing faces glued.

The magnetic sensors may be placed symmetrically along X axis and Y axis on a plane, and the magnet may be disposed at about a center of the magnetic sensors.

The foregoing structure can facilitate the assembly, enable downsizing and increase the life of the product, thereby being able to promote a wide variety of applications.

In the pointing device in accordance with the present invention, the resin and magnet may be glued at only a center of the magnet.

By thus gluing only the center of the magnet rather than gluing the entire contact faces between the magnet and resin when mounting the magnet on the resin, it becomes possible to make effective use of the elasticity of the resin, thereby being able to increase the rotatable angle (braking range) of the magnet.

In addition, it is preferable to provide a hollow to make the portion and its surroundings, at which the magnet is mounted on the resin, thinner than the remaining portion at which the magnet is not mounted.

The thinner the thickness of the resin under the magnet is, the greater the rotatable angle (movable range) of the magnet becomes. Thus, it is preferable to thin the portion in the resin expected to be moved.

Furthermore, when the resin is thinned for the reason described above, although the movable range increases, the hollow in the resin can be collapsed when the pointing device is manipulated. To prevent the collapse, it is preferable to provide one or more projections on the printed circuit board side surface of the resin. The projections offer marked advantages in preventing the collapse of the entire resin when they are provided near the outer edge of the hollow of the resin.

To accomplish the foregoing objects, according to one aspect of the present invention, there is provided a pointing device comprising: a printed circuit board; a plurality of magnetic sensors placed on the printed circuit board; an elastic member mounted on the printed circuit board to constitute a hollow for enabling sway in any desired direction; a pushing member formed on the elastic member to constitute the hollow together with the elastic member; and a magnet fixed to the pushing member, wherein the plurality of magnetic sensors detect magnetic flux density changes caused by the displacement of the magnet due to elastic deformation of the elastic member, and output one of coordinate information or vector information about an input point.

According to another aspect of the present invention, there is provided a pointing device comprising: a printed circuit board; a plurality of magnetic sensors placed on the printed circuit board; an elastic member mounted on the printed circuit board to constitute a hollow for enabling sway in any desired direction; and a magnet placed on the elastic member, wherein the plurality of magnetic sensors detect magnetic flux density changes caused by the displacement of the magnet due to elastic deformation of the elastic member, and output one of coordinate information or vector information about an input point.

The magnet may be displaceable in a direction perpendicular to the printed circuit board.

It is preferable that the elastic member have at least one bend that forms the hollow.

The bend preferably includes a U grooved undercut. The U grooved undercut may have a depth less than the thickness of the elastic member.

The bend of the elastic member may have a chamfer or rounding.

The elastic member may have a pushing member on its top surface. The top surface of the pushing member is preferably one of a roughened surface, concave surface, convex surface, convex quadrilateral pyramid and concave quadrilateral pyramid. The pointing device may further comprise a switch on the hollow side surface of the printed circuit board. The switch may be a tactile switch.

To accomplish the foregoing objects, according to the present invention, there is provided a magnetic sensor array for a pointing device, the magnetic sensor array comprising: a printed circuit board; a plurality of magnetic sensors placed on the printed circuit board in a specified arrangement, for detecting magnetic flux density changes and for outputting coordinate information or vector information about an input point; and a magnet or ferromagnetic material placed at a specified position with respect to the plurality of magnetic sensors.

The magnet may be placed at an equidistant position from the magnetic sensors.

The four magnetic sensors may be placed at four equidistant positions from the magnet, which is placed at a center of the magnetic sensors.

To accomplish the foregoing objects, according to one aspect of the present invention, there is provided a pointing device manipulation adapter comprising a magnet, wherein the pointing device manipulation adapter is to be fitted to a pointing device including a magnet and a plurality of magnetic sensors for detecting a position of the magnet.

The pointing device manipulation adapter may further comprise an elastic member to be fitted to the pointing device, and a manipulation member mounted on the elastic member.

The pointing device manipulation adapter may further comprise a hold-down member to be fitted to the pointing device; and a manipulation member whose displacement is checked by the hold-down member.

The magnet may be embedded in elastic member or in the manipulation member.

According to an aspect of the present invention, there is provided a pointing device manipulation adapter comprising: an elastic member that is to be fitted to a pushing member of a pointing device, and that constitutes a hollow for making the elastic member swayable in any desired direction; and a manipulation member mounted on the elastic member, wherein the pointing device includes a magnet and a plurality of magnetic sensors for detecting magnetic flux density changes caused by displacement of the magnet due to elastic deformation of the elastic member, and outputs one of coordinate information and vector information about an input position.

The pointing device manipulation adapter may further comprise a magnet fitted into the elastic member and projecting toward the hollow. It may further comprise a magnet placed on the manipulation member, and projecting toward the hollow.

According to another aspect of the present invention, there is provided a pointing device manipulation adapter comprising: an elastic member placed on a pushing member of a pointing device, and swayable in any desired direction; a manipulation member mounted on the elastic member; and a hold-down member fitted to an edge of the pushing member for restraining displacement of the manipulation member, wherein the pointing device includes a magnet and a plurality of magnetic sensors for detecting magnetic flux density changes caused by displacement of the magnet due to elastic deformation of the elastic member, and outputs one of coordinate information and vector information about an input position.

The manipulation member may be provided with a magnet. The top surface of the manipulation member may be one of a roughened surface, concave surface, convex surface, convex quadrilateral pyramid and concave quadrilateral pyramid.

BRIEF DESCRIPTION OF THE DRAWINGS

FIG. 9A is its cross-sectional view, and FIG. 9B is its plan view;

FIG. 10A is its cross-sectional view, and FIG. 10B is its plan view;

FIG. 12A shows left direction sway, and FIG. 12B shows right direction sway;

FIG. 14A shows a U grooved undercut; FIG. 14B shows a chamfer; FIG. 14C shows a rounding; and FIG. 14D shows a w grooved undercut;

FIG. 16A is a cross-sectional view; and FIG. 16B is a plan view;

FIG. 18A shows left direction sway, and FIG. 18B shows right direction sway;

FIG. 28A shows a right direction sway; and FIG. 28B shows a left direction sway;

BEST MODE FOR CARRYING OUT THE INVENTION

The best mode for carrying out the invention will now be described with reference to the accompanying drawings.

Figure 4:
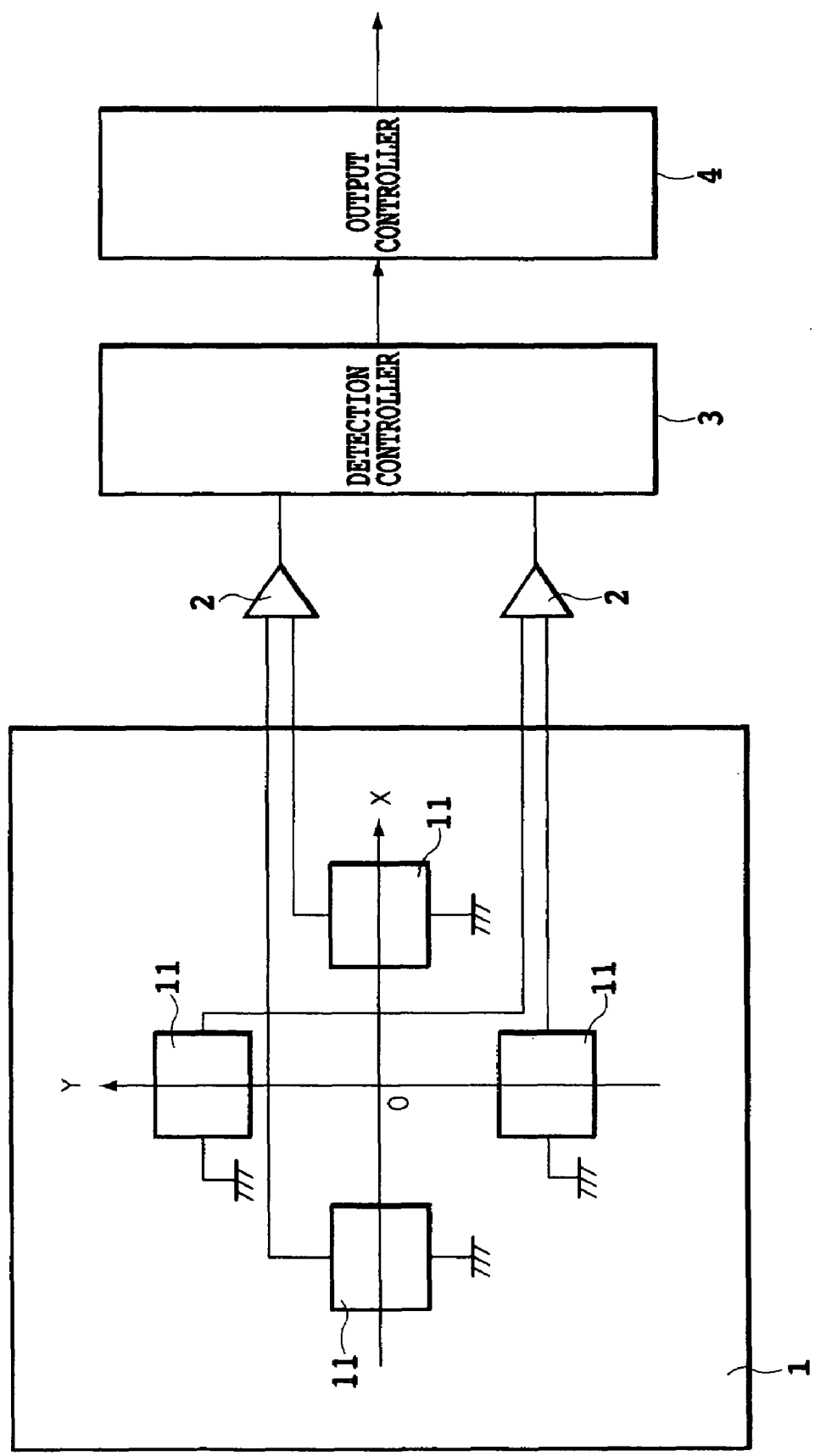
FIG. 4 is a block diagram showing a configuration of a magnetic detecting circuit of both a conventional example and an embodiment of the pointing device in accordance with the present invention.
Figure 5:
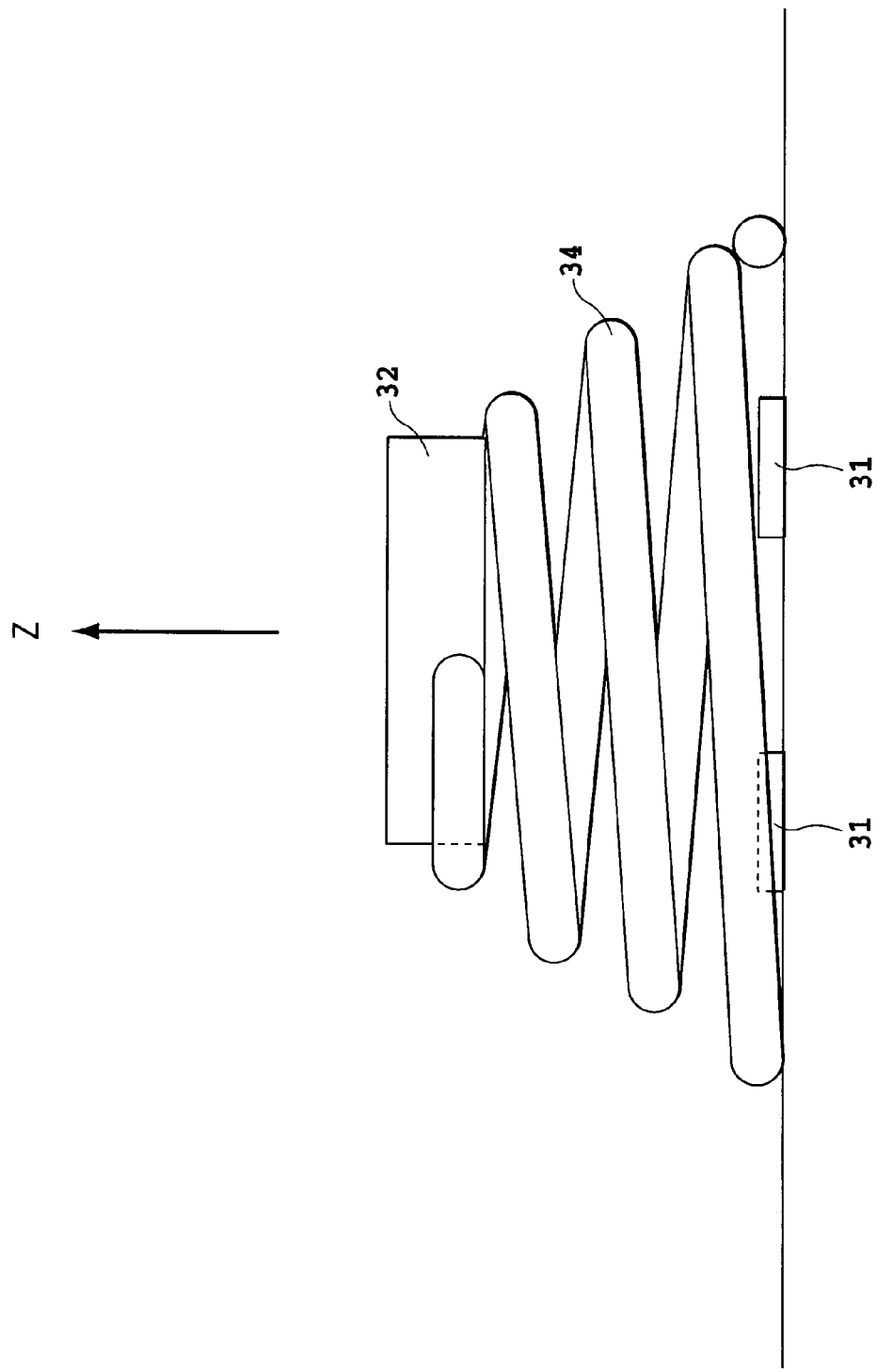
FIG. 5 is a view showing an example of a magnet support structure used by a conventional pointing device.
Figure 6:
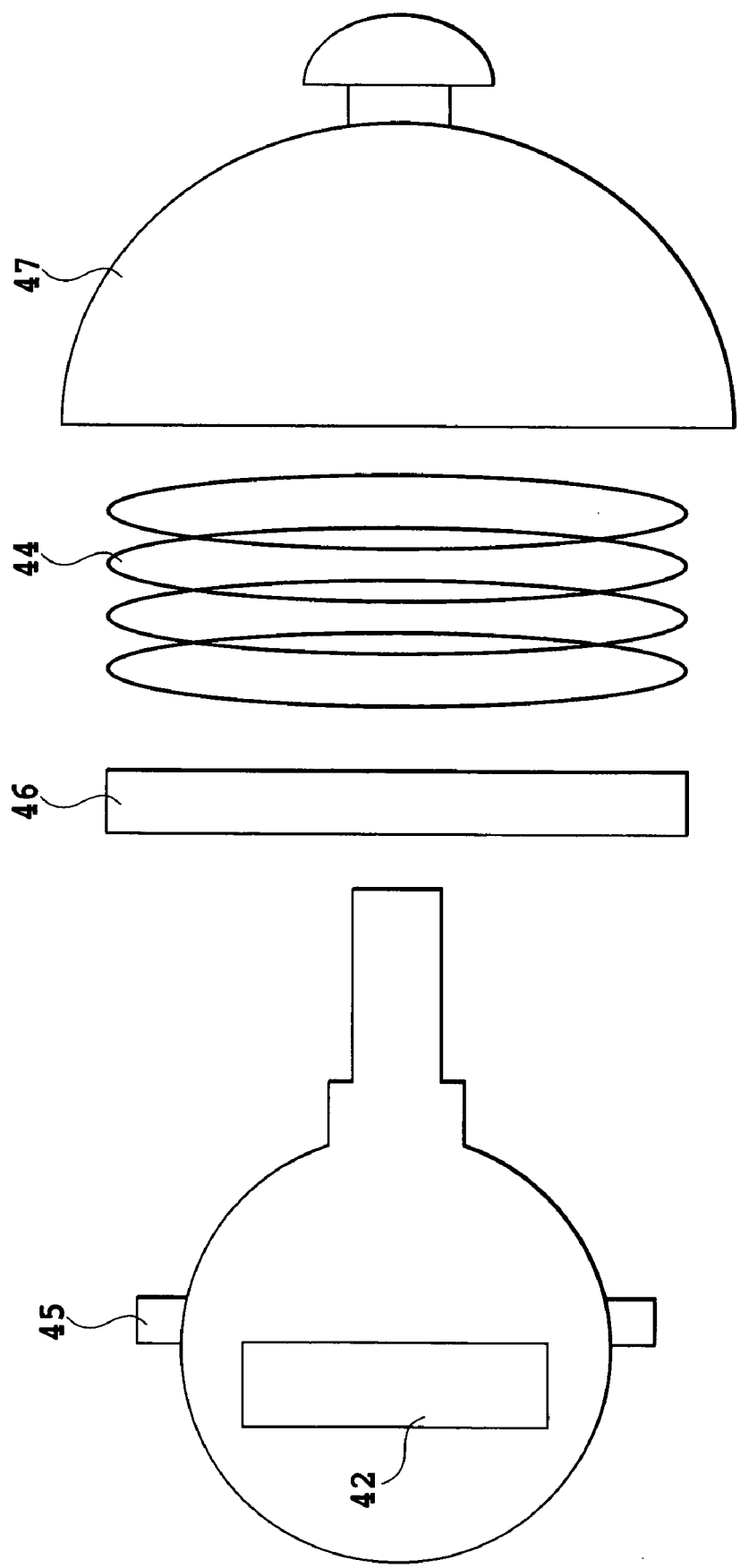
FIG. 6 is a view showing another example of a magnet support structure used by a conventional pointing device.

A block diagram showing a configuration of the magnetic detecting circuit of a magnetic detecting type pointing device in accordance with the present invention is the same as that of the conventional circuit as shown in FIG. 4. Specifically, the detecting section 1 includes four magnetic sensors (such as Hall effect devices) 11, and the four Hall effect devices 11 are placed symmetrically two by two along the X and Y axes. The magnet is disposed close to the center of the four Hall effect devices. The output voltages of the Hall effect devices 11 vary in response to the magnetic field changes caused by the movement of the magnet. The differential amplifiers 2 differentially amplify the outputs of the Hall effect devices 11 on the X axis and Y axis respectively. They are preset such that their outputs become zero when the magnetic field in the Z axis direction is symmetric with respect to origin O, that is, when the magnetization direction of the magnet is in the vertical direction. The system is configured such that the differential amplifiers 2 generate outputs in response to the movement of the magnet, and that the detection controller 3 converts the outputs (analog values) to the X coordinate value and Y coordinate value, and the output controller 4 outputs them.

Figure 1:
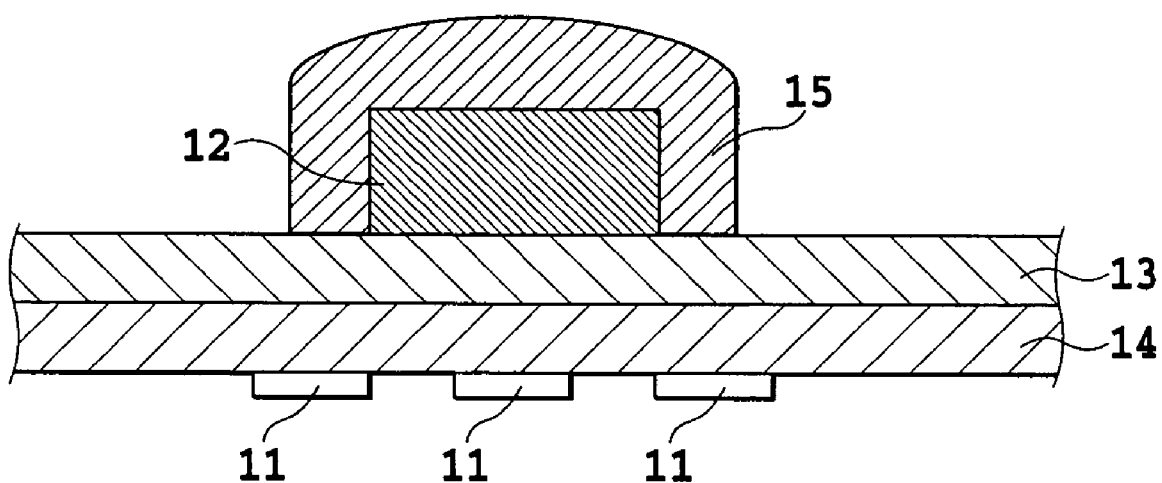
FIG. 1 is a cross-sectional view showing a structure of an embodiment of the pointing device in accordance with the present invention.

FIG. 1 is a cross-sectional view showing a structure of an embodiment of the pointing device in accordance with the present invention. In FIG. 1, reference numerals 11 designate the magnetic sensors. The reference numeral 12 designates a magnet, 13 designates a silicone resin, 14 designates a printed circuit board, and 15 designates a magnet cover. As described above, the magnetic sensors 11 are disposed on the printed circuit board 14 in such a manner that they are symmetric two by two along the X axis and Y axis, respectively. The magnet 12 is magnetized in the vertical direction, though the direction of the magnetization is not limited. The opposing faces of the silicone resin 13 and printed circuit board 14 are not glued.

The silicone resin 13 is deformed easily by an external force, and restores to its initial state as soon as the external force is removed. Thus, in response to a tilt of the magnet cover 15 in a certain direction by a manipulation, the magnet 12 is also tilted. However, it returns to its initial state as soon as the external force is removed, which corresponds to the action of the coiled spring in the conventional magnet support structure. Using the silicone resin 13 can reduce the number of components, facilitate the assembly and achieve downsizing. The magnet 12 and silicone resin 13 can be replaced by a rubber magnet.

In addition, since the magnetic detecting type pointing device is free from the wear of the components due to contact, it can prolong the life as compared with the touch type pointing device.

Figure 2:
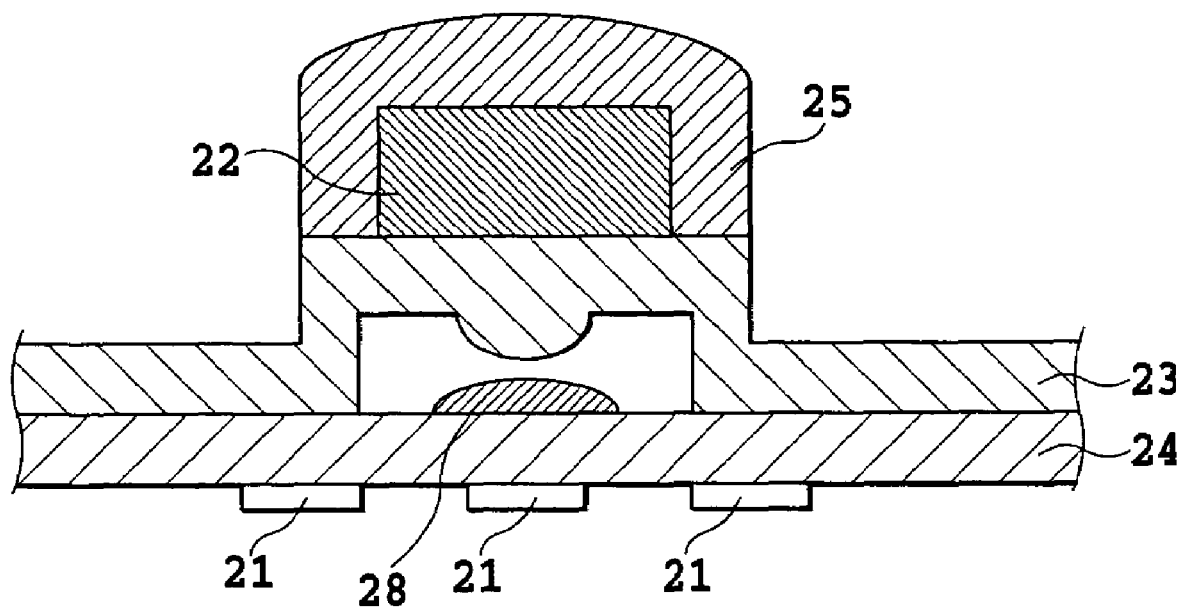
FIG. 2 is a cross-sectional view showing a structure of another embodiment of the pointing device in accordance with the present invention.

FIG. 2 is a cross-sectional view showing a structure of another embodiment of the pointing device in accordance with the present invention. It includes a switch 28 disposed under the silicone resin 23 of an embodiment as shown in FIG. 1 to provide the pointing device with a switch function. In other words, it places the switch 28 on the printed circuit board 24 at the side of the silicone resin 23.

Although the pointing device is fundamentally a device for producing the coordinate values of an input point, the switch function enables the pointing device not only to produce the coordinate values, but also to have a decision function. The switch function is achieved by pressing the magnet cover 25 toward the magnet 22. The switch provides the pointing device with two signals, the coordinate values and decision signal, just as a mouse for a personal computer.

Although any switches including pushbutton switches can be used as the switch 28, the following switches are appropriate: a tactile switch that enables a user to confirm the depression (with providing a feeling of a click) and automatically returns to a normal position after pushing the switch; or a tact switch or touch switch that confirms a target object by utilizing physical contact with the target object.

Figure 3:
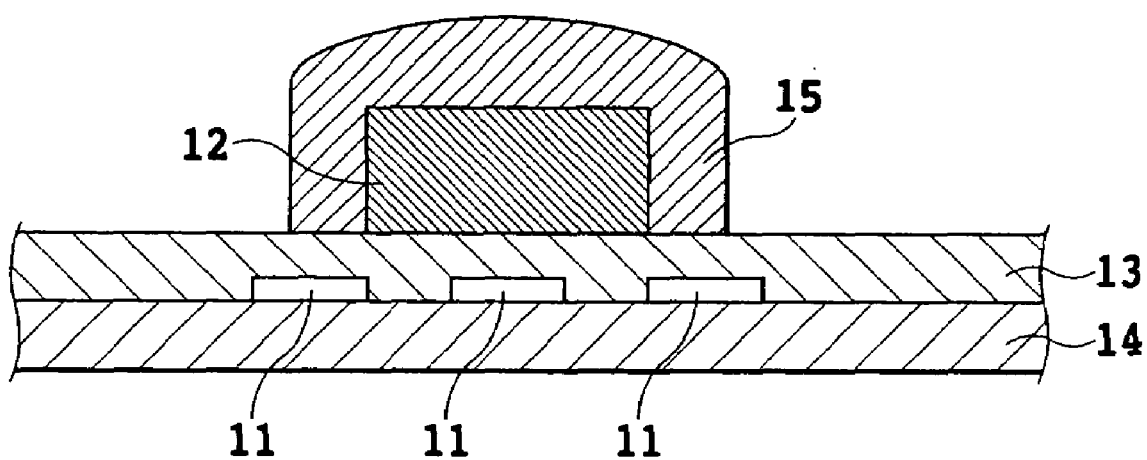
FIG. 3 is a cross-sectional view showing a structure of still another embodiment of the pointing device in accordance with the present invention.

The foregoing embodiment of the pointing device places the magnetic sensors 11 on the bottom surface of the printed circuit board 14, which is farther away from the magnet 12 than the top surface thereof. If they can be placed on the top surface of the printed circuit board 14 closer to the magnet 12 as shown in FIG. 3, a more high sensitive pointing device can be achieved because of an increase in the output sensitivity of the magnetic sensors 11. The present invention is not limited to the foregoing embodiments, but is applicable to a variety of variations.

Next, a prototype in accordance with the present invention will be described below.

The pointing device with the structure as shown in FIG. 2 was built as a prototype. As the magnetic sensors 21, four Hall effect devices, HG-106C (trade name), manufactured by Asahi Kasei Electronics Co., Ltd. were used. The diagonal distance between the centers of the Hall effect devices disposed in a square was about 3.3 mm. As the magnet 22, a samarium-cobalt magnet 1, 4 mm in diameter and 2 mm in thickness was used. The magnetization direction of the magnet 22 is vertical and its top end being a north pole and bottom end being a south pole. As the printed circuit board 24, a 0.7 mm thick glass epoxy board was used. The silicone resin 23 was 0.75 mm in thickness. As the switch 28, a 0.15 mm thick tactile switch was employed.

The total area of the pointing device was about 6 mm square and about 5 mm in thickness. The output voltages of the individual Hall effect devices 21 were measured with tilting the magnet 22. The outputs of the individual Hall effect devices 21 at the origin position were about 60 mV. When the magnet 22 was tilted toward the Hall effect devices 21, the output voltages vary up to about 80 mV at the maximum.

The range of the variations of the output voltages was about 20 mV. Considering that the differential amplifiers are used for the signal processing of the outputs of the magnetic sensors 21, and that an externally attached IC is used, it is evident that the support structure of the magnet 22 satisfies the requirement for the output voltages of the magnetic sensors 21 as the pointing device.

In addition, it was confirmed that providing the tactile switch did not obstruct the function of the pointing device.

As described above, the magnetic detecting type pointing device in accordance with the present invention is configured such that the magnet producing magnetic forces is disposed on the elastic resin and the magnetic sensors are placed on the printed circuit board, and that the magnetic sensors detect the ambient magnetic flux density changes caused by the displacement of the magnet, and output the coordinate values of the input point. Accordingly, it can reduce the number of components such as the coiled spring required by the conventional magnet support structure, can facilitate the assembly, achieve downsizing, and prolong the lifetime. As a result, it can provide a pointing device meeting a variety of applications appropriately.

Figure 7:
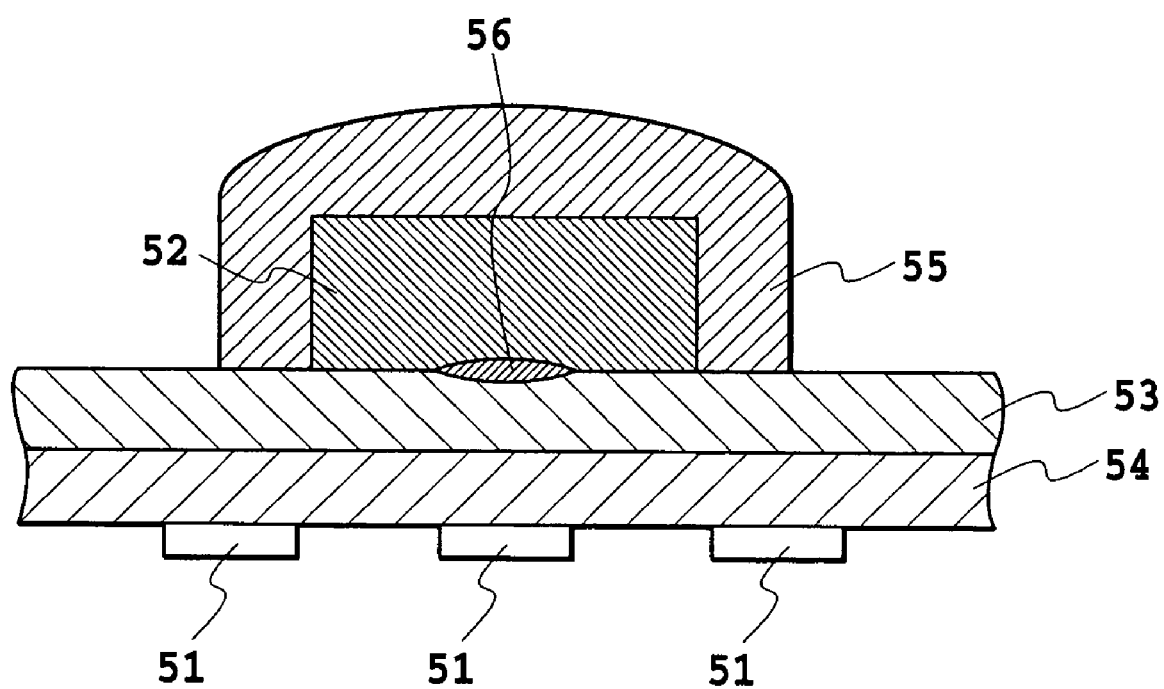
FIG. 7 is a cross-sectional view showing a structure of another embodiment of the pointing device in accordance with the present invention.

Next, FIG. 7 is a cross-sectional view showing a structure of another embodiment of the pointing device in accordance with the present invention. In FIG. 7, the reference numerals 51 designate magnetic sensors. The reference numeral 52 designates a magnet, 53 designates a silicone resin, 54 designates a printed circuit board, and 55 designates a magnet cover. As described above, the magnetic sensors 51 are placed on the printed circuit board 54 in such a manner that they are symmetric two by two along the X axis and Y axis, respectively. The magnet 52 is magnetized in the vertical direction, though the direction of the magnetization is not limited. The magnet 52 and silicone resin 53 are glued to each other at their center with an adhesive 56. They are not glued to each other all over the contact faces, but only at their center to make effective use of the elasticity of the silicone resin 53, thereby being able to increase the rotatable angle (movable range) of the magnet 52. Incidentally, the opposing faces of the silicone resin 53 and printed circuit board 54 are not glued.

The silicone resin 53 is deformed easily by an external force, and returns to its initial state as soon as the external force is removed. Thus, in response to a tilt of the magnet cover 55 in a certain direction by a manipulation, the magnet 52 is also tilted. However, it returns to its initial state as soon as the external force is removed, which corresponds to the action carried out by the coiled spring in the conventional structure. Using the silicone resin 53 can reduce the number of components, facilitate the assembly and achieve downsizing.

In addition, since the magnetic detecting type pointing device is free from the wear of the components due to contact, it can prolong the life as compared with the touch type pointing device.

Figure 8:
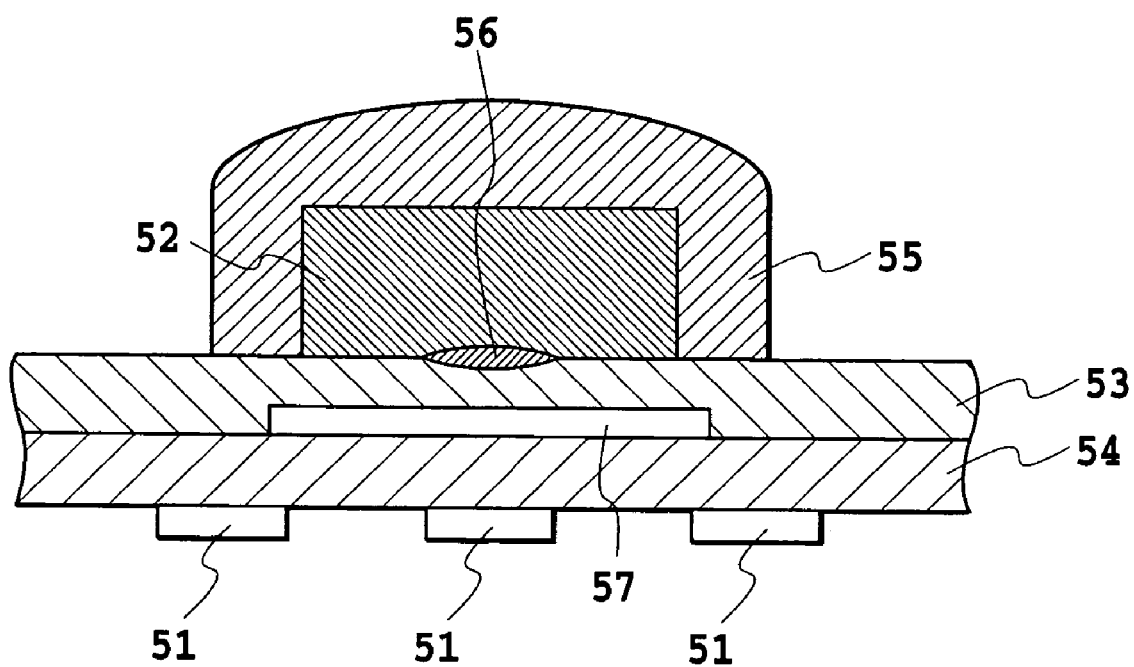
FIG. 8 is a cross-sectional view showing a structure of still another embodiment of the pointing device in accordance with the present invention.

FIG. 8 is a cross-sectional view showing a structure of another embodiment of the pointing device in accordance with the present invention. In FIG. 8, the same reference numerals designate portions having the same functions as those of FIG. 7. The configuration of FIG. 8 differs from that of FIG. 7 in that it includes a hollow 57 which is formed by thinning out a portion of the silicone resin 53 under the magnet 52, such that the portion becomes thinner than the remaining portion of the silicone resin 53, on which the magnet 52 is not mounted. The thinner the silicone resin 53 under the magnet 52 is, the greater the rotatable angle (movable range) of the magnet 52 will be. Thus, it is preferable to make the portion of the silicone resin 53 enabling the movement as thin as possible.

Figure 9A:
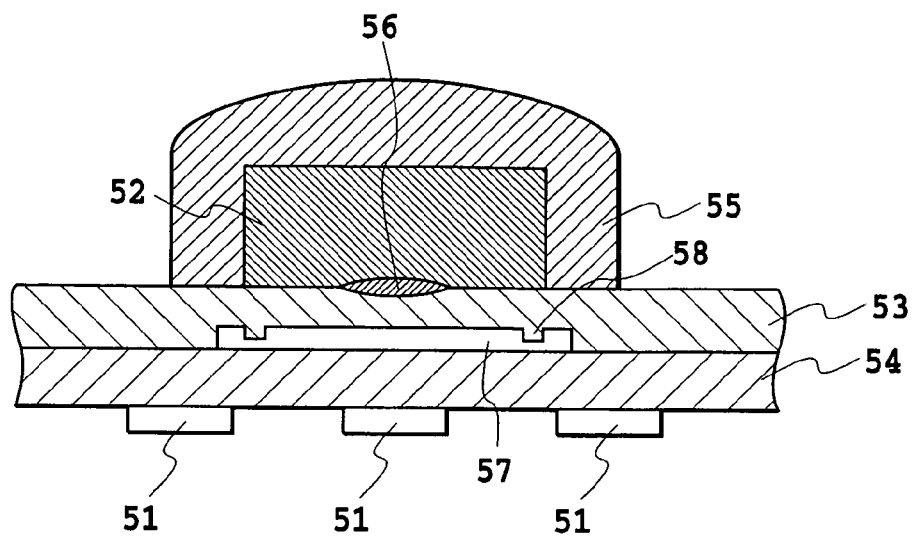
FIGS. 9A and 9B are views showing a structure of another embodiment of the pointing device in accordance with the present invention.
Figure 9B:
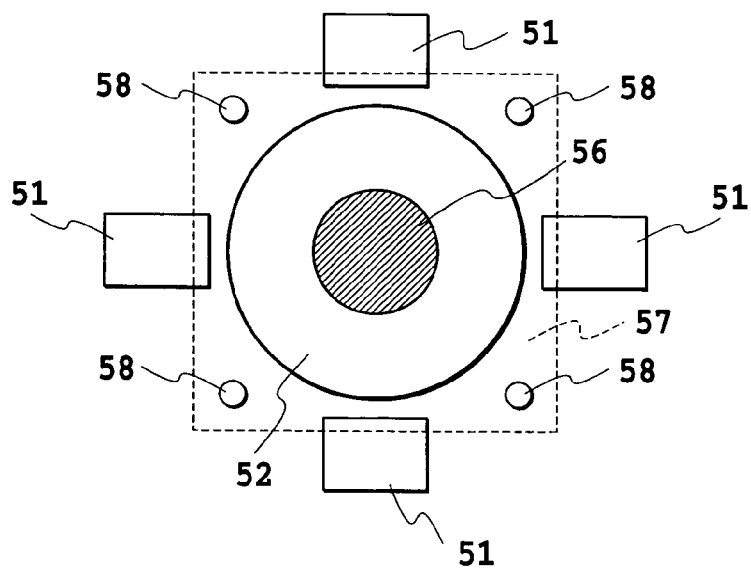

FIGS. 9A and 9B are views showing another embodiment of the pointing device in accordance with the present invention: FIG. 9A is a cross-sectional view; and FIG. 9B is a plan view. In these figures, the same reference numerals designate portions having the same functions as those of FIG. 8. This embodiment includes projections 58 provided in the hollow in the silicone resin 53 in the embodiment of FIG. 8. Although the movable range increases by providing the hollow 57 by thinning out the silicone resin 53, the hollow in the silicone resin 53 can be depressed entirely, when the pointing device is manipulated. To prevent the depression, the embodiment provides one or more projections 58 on the surface of the silicone resin 53 at the side of the printed circuit board. The projections 58 offer marked advantages in preventing the depression of the entire silicone resin 53 when they are provided near the outer edge of the hollow 57 of the silicone resin 53. Similar advantages can be achieved by providing one or more projections on the printed circuit board 54 toward the hollow 57.

The foregoing embodiment places the magnetic sensors 51 on the bottom surface of the printed circuit board 54, which is farther away from the magnet 52 than the top surface thereof. If they can be placed on the top surface closer to the magnet 52, a more high sensitive pointing device can be achieved because of an increase in the output sensitivity of the magnetic sensors 51.

Figure 10A:
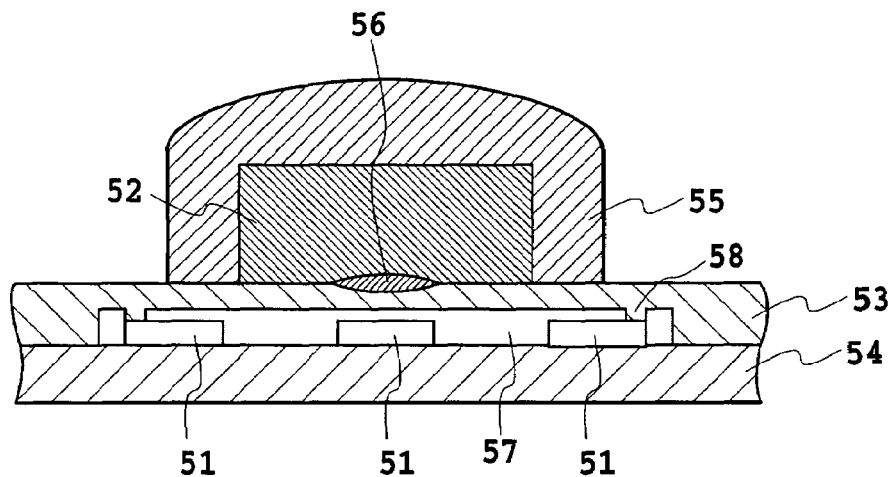
FIGS. 10A and 10B are views showing a structure of another embodiment of the pointing device in accordance with the present invention.
Figure 10B:
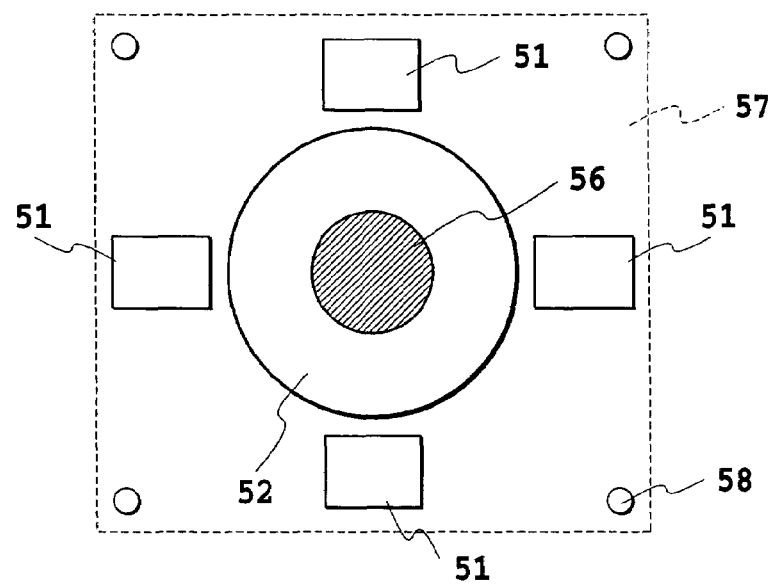

FIGS. 10A and 10B are views showing an embodiment of such a pointing device: FIG. 10A is a cross-sectional view; and FIG. 10B is a plan view. In FIGS. 10A and 10B, the same reference numerals designate portions having the same functions as those of FIGS. 9A and 9B. The magnetic sensors 51 are placed on the top surface of the printed circuit board 54, which is closer to the magnet 52 than the bottom surface thereof, such that the magnetic sensors 51 protrude into the hollow 57. In this case, although the magnetic sensors 51 themselves can prevent the depression of the entire silicone resin 53, the projections 58 near the outer edge of the hollow 57 can prevent the depression of the entire silicone resin 53 more positively. The present invention is not limited to the foregoing embodiments, but a variety of modifications can be carried out.

As described above, the magnetic detecting type pointing device in accordance with the present invention is configured such that the magnet producing magnetic forces is mounted on the elastic resin and the magnetic sensors are placed on the printed circuit board, and that the magnetic sensors detect the ambient magnetic flux density changes caused by the displacement of the magnet, and output the coordinate values of the input point. Accordingly, it can reduce the number of components such as the coiled spring required by the conventional magnet support structure, facilitate the assembly, achieve downsizing, and prolong the lifetime. As a result, it can provide a pointing device capable of meeting a variety of applications appropriately.

In addition, when placing the magnet on the resin, they are not glued to each other all over the contact face, but only at their center to make effective use of the elasticity of the resin, thereby being able to increase the rotatable angle (movable range) of the magnet.

Furthermore, since the portion of the resin, on which the magnet is mounted, is thinner than the remaining portion of the resin, on which the magnet is not mounted, the rotatable angle (movable range) of the magnet can be increased.

Besides, the projections provided in the hollow of the resin can prevent the hollow to be depressed in its entirety.

With the foregoing structure, the pointing device in accordance with the present invention can increase the rotatable angle (movable range) of the magnet and the range of the outputs of the magnetic sensors, thereby being able to construct a more accurate and reliable pointing device.

Figure 11:
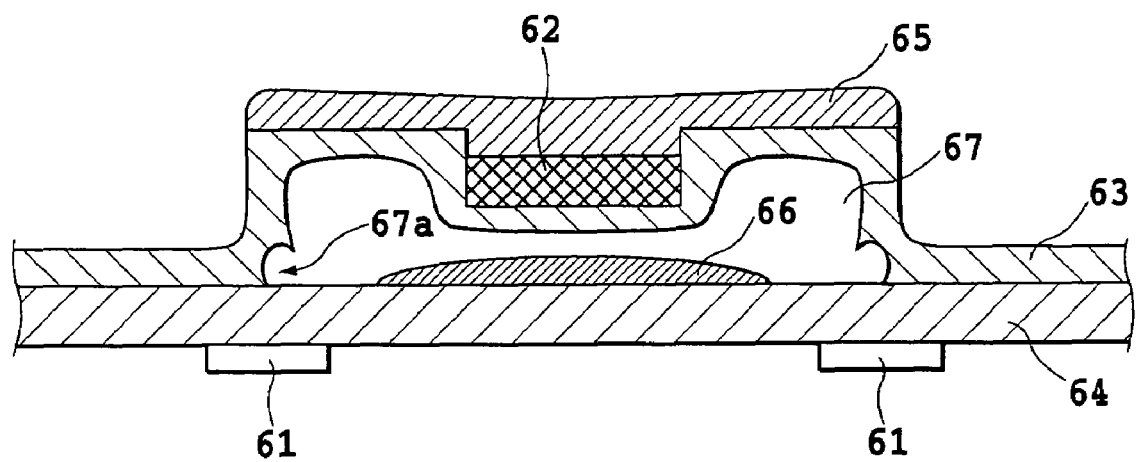
FIG. 11 is a cross-sectional view showing a structure of still another embodiment of the pointing device in accordance with the present invention.

FIG. 11 is a cross-sectional view showing a structure of another embodiment of the pointing device in accordance with the present invention. In FIG. 11, the reference numerals 61 designate magnetic sensors. The reference numeral 62 designates a magnet, 63 designates a silicone resin as an elastic member, 64 designates a printed circuit board, 65 designates a pushing member, 66 designates a switch, 67 designates a hollow and 67a designates an undercut. As described above, the magnetic sensors 61 are disposed on the printed circuit board 64 in such a manner that they are symmetric two by two along the X axis and Y axis, respectively. The magnet 62 is magnetized in the vertical direction.

When a user displaces the silicone resin 63 in a plane parallel to the printed circuit board 64, the silicone resin 63 sways on the fulcrum at the bottom of the undercut 67a, in conjunction with which the magnet 62 sways in the same manner.

Thus, the pointing device in accordance with the present invention is configured such that it comprises the plurality of magnetic sensors 61 placed on the printed circuit board 64; the elastic member 63 including the hollow 67 provided on the printed circuit board 64 to enable the sway in a desired direction; and the magnet 62 mounted on the elastic member 63, and that the plurality of magnetic sensors 61 detect the magnetic flux density changes caused by the sway of the magnet 62 due to in the elastic deformation of the elastic member 63, thereby outputting the coordinate information or vector information.

The magnet 62 is swayable in the horizontal direction, and is displacable in the direction perpendicular to the printed circuit board 64, thereby possessing flexibility enabling the magnet 62 to move in the horizontal and vertical directions with respect to the printed circuit board 64.

Figure 13:
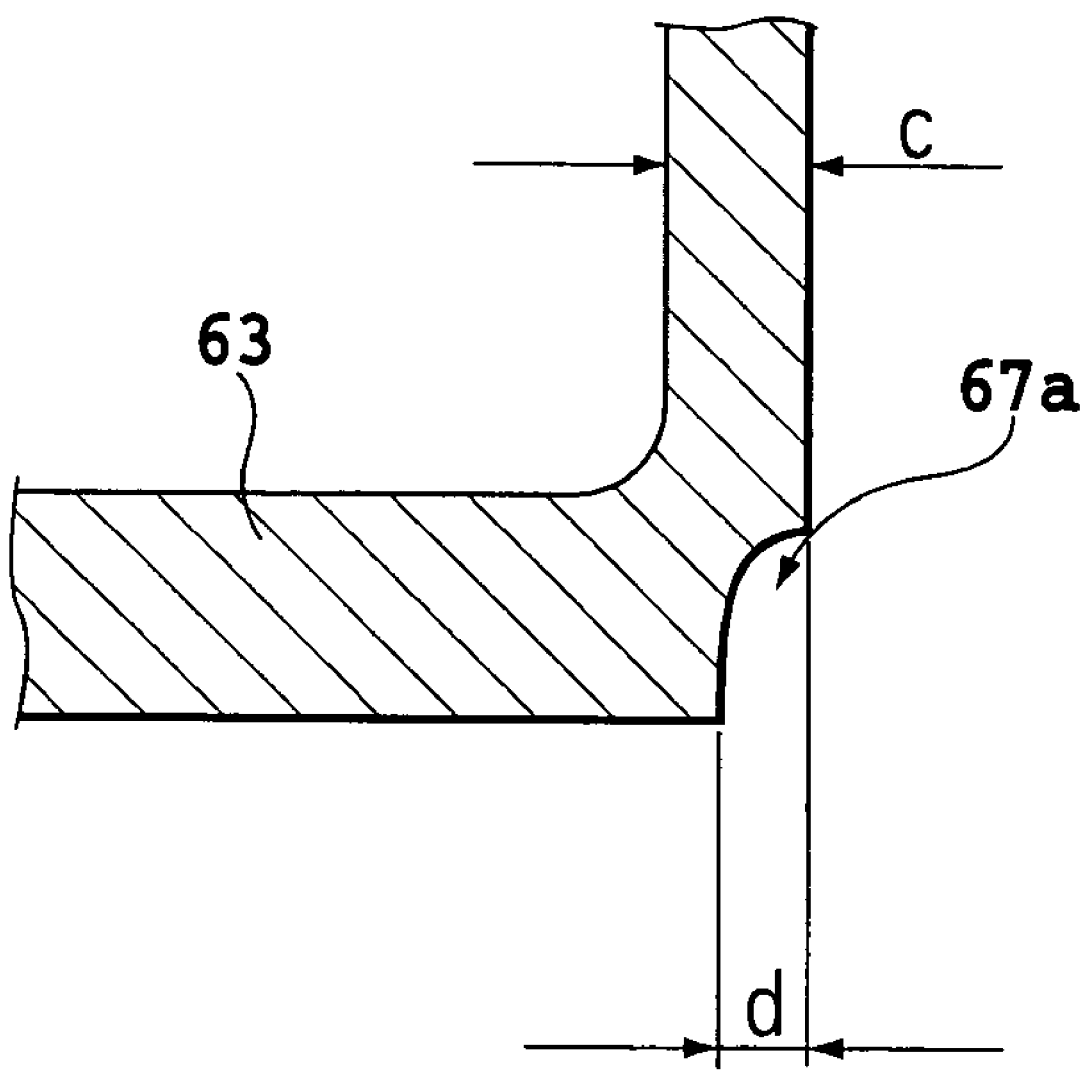
FIG. 13 is a cross-sectional view showing a relationship between the thickness and the depth of an undercut of an elastic member.
Figure 14A:
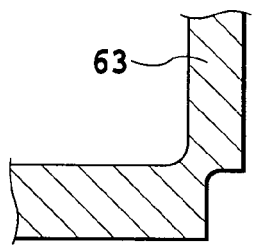
FIGS. 14A-14D are cross-sectional views showing a variety of shapes of thin-wall portions.
Figure 14B:
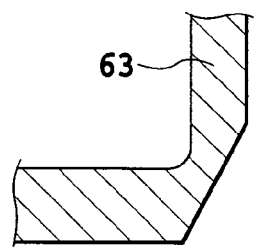
Figure 14C:
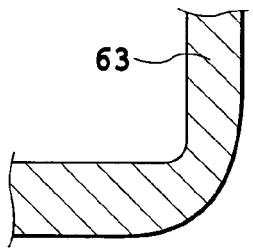
Figure 14D:
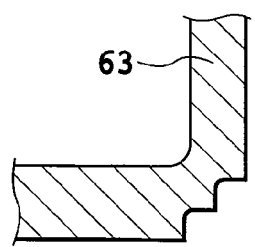

The elastic member 63 has at least one bend and the undercut 67a formed in the bend to facilitate the swayability of the magnet 62. It is preferable that the undercut 67a has a shape of a U grooved undercut as shown in FIG. 14A, the depth d of which is less than the thickness c of the elastic member 63 as shown in FIG. 13. In addition, the notch can have one of the shapes of the chamfer as shown in FIG. 14B, rounding as shown in FIG. 14C and W grooved undercut as shown in FIG. 14D.

In the hollow 67, the switch 66 is mounted on the printed circuit board 64 to provide the pointing device with the switch function. As the switch 66, a tactile switch is suitable that enables a user to confirm the depression (with providing a feeling of a click) and automatically returns to a normal position after pushing the switch, as described above.

The pushing member 65 is preferably made of a rigid material to prevent the magnet 2 from being shaken or hollowed or displaced when pressed by a finger. In particular, to reduce the intensity of the leakage magnetic field leakage outside, such a structure is possible that uses a non-magnetic material as the pushing member 65, and separates the magnets from the pushing member surface, or conversely that uses a ferro magnetic material with a high permeability to provide a magnetic shield at the same time. For example, the pushing member 65 can be made of polycarbonate, or one of metals such as aluminum alloys, nickel-iron alloys such as permalloys and pure iron.

As for the magnetic detecting circuit, the conventional circuit as shown in FIG. 4 is applicable. It is also possible to use the magnetoresistive elements disclosed in the foregoing Japanese patent Application publication No.7-117876 (1995).

Figure 12A:
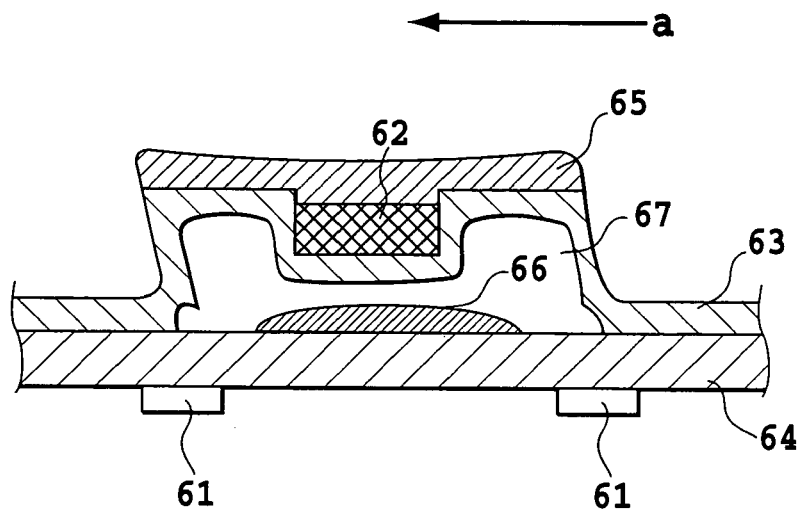
FIGS. 12A and 12B are cross-sectional views illustrating operability of the pointing device in accordance with the present invention.
Figure 12B:
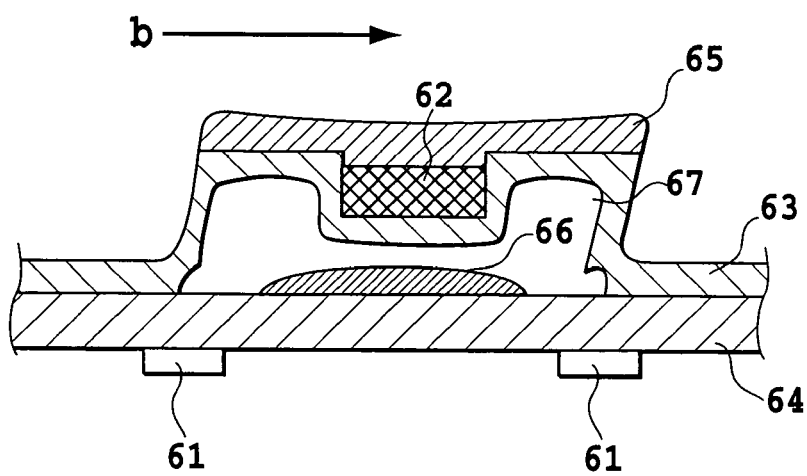

With such a structure, being pushed in the direction of the arrow a as illustrated in FIG. 12A, that is, from right to left, the pushing member 65 moves in the left direction on the fulcrum at the coupling end of the elastic member 63 and the printed circuit board 64. On the contrary, being pushed in the direction of the arrow b as illustrated in FIG. 12B, that is, from left to right, the pushing member 65 moves in the right direction on the fulcrum at the coupling end of the elastic member 63 and the printed circuit board 64. Thus, the magnet 62 fixed to the elastic member 63 is freely swayable. The manipulation is carried out with the pad of the index finger or that of the thumb. In this case, considering the fitness with the finger pad, the top surface of the pushing member 65 is preferably one of a roughened surface, concave surface, convex surface, convex quadrilateral pyramid and concave quadrilateral pyramid. In addition, the pushing member 65 itself can have a plane view of one of the circle, square, rectangle, octagon, ellipse and gear-like shape.

Figure 15:
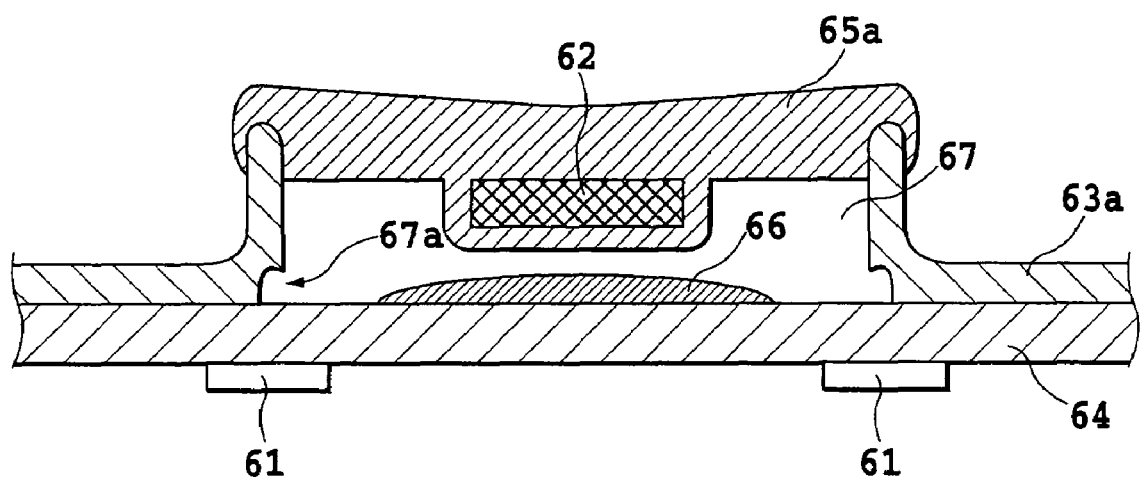
FIG. 15 is a cross-sectional view showing a structure of another embodiment of the pointing device in accordance with the present invention.

FIG. 15 is a cross-sectional view showing a structure of another embodiment of the pointing device in accordance with the present invention. Although the magnet 62 is fixed to the elastic member 63 in FIG. 11, this is not essential. For example, the magnet 62 can be fixed to the pushing member 65a, a nonelastic member constituting the hollow 67 together with the elastic member 63a as shown in FIG. 15.

Next, a prototype in accordance with the present invention will be described.

The pointing device with the structure as shown in FIG. 11 was made as a prototype. As the magnetic sensors 61, four Hall effect devices, HG-106C (trade name), manufactured by Asahi Kasei Electronics Co., Ltd. were used. The diagonal distance between the centers of the Hall effect devices was about 3.3 mm. As the magnet 62, a neodymium group magnet 2 mm in diameter and 0.5 mm in thickness was used. The magnetization direction of the magnet is vertical and its top end being a north pole and bottom end is a south pole.

As the printed circuit board 64, a 0.6 mm thick glass epoxy board was used. The silicone resin 63 was 0.2-0.5 mm in thickness. As for the rubber hardness, although it must be determined in accordance with the designed thickness, it is preferable that the standard rubber hardness should be about 30-80. As the switch 66, a 0.15 mm thick tactile switch was employed. The thickness from the top surface of the printed circuit board 64 to the top surface of the pushing member 65 was reduced to less than 2 mm, and the pushing member was made 6.4 mm in diameter.

As described above, the pointing device in accordance with the present invention is configured such that it comprises the plurality of magnetic sensors placed on the printed circuit board; the elastic member including the hollow 67 that is mounted on the printed circuit board to enable the sway in a desired direction; the pushing member fixed to the elastic member in such a manner that it construct the hollow together with the elastic member; and the magnet mounted on the elastic member, and that the plurality of magnetic sensors detect the magnetic flux density changes caused by the sway of the magnet due to the elastic deformation of the elastic member, thereby outputting the coordinate information. Thus, it can make the pointing device thinner, and implement the pointing device with the high degree of ease of use, enabling a large output even when the magnet with a small magnetic force is used.

Figure 16A:
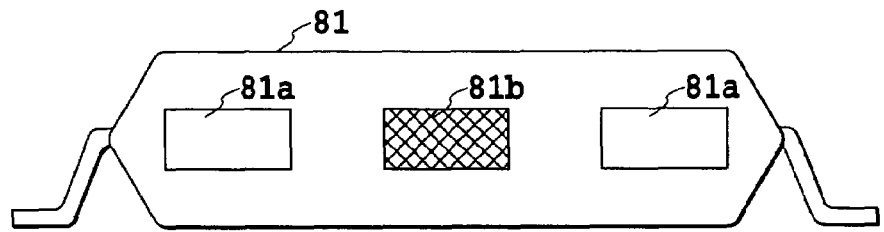
FIGS. 16A and 16B are views showing an embodiment of the magnetic sensor array in accordance with the present invention.
Figure 16B:
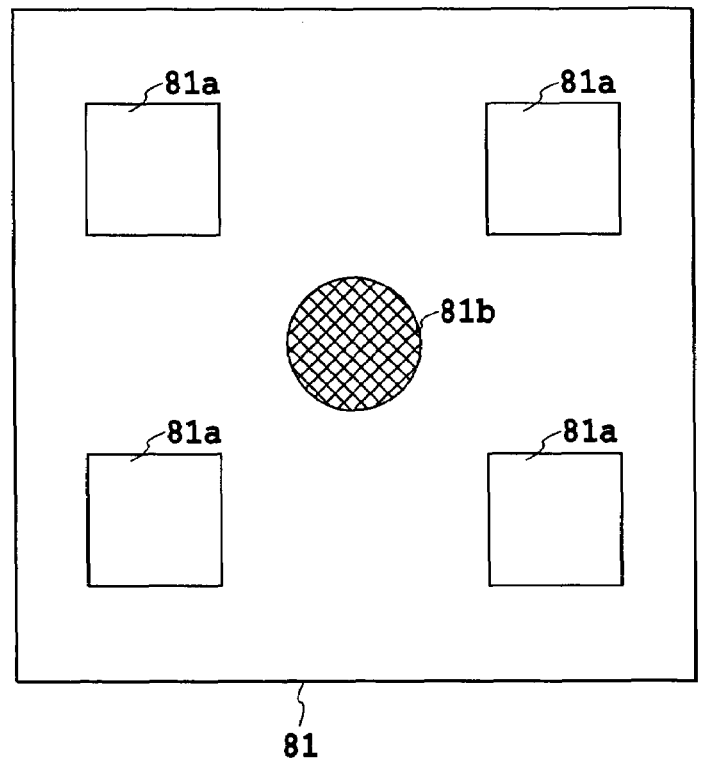

FIGS. 16A and 16B are views showing a structure of an embodiment of the magnetic sensor array in accordance with the present invention: FIG. 16A is a cross-sectional view; and FIG. 16B is a plan view. In FIGS. 16A and 16B, the reference numeral 81 designates a magnetic sensor array. The magnetic sensor array 81 comprises four magnetic sensors 81a disposed at equidistant positions from each other, and a magnet 81b placed at the center of the magnetic sensors 81a. Instead of the magnet 81b, a ferromagnetic material can be used. It is preferable in this case that the ferromagnetic material used have little fluctuations in the residual magnetization. In addition, although the magnetic sensors 81a are disposed at the four corners of a square, they can be placed like forming a rhombus.

Figure 17:
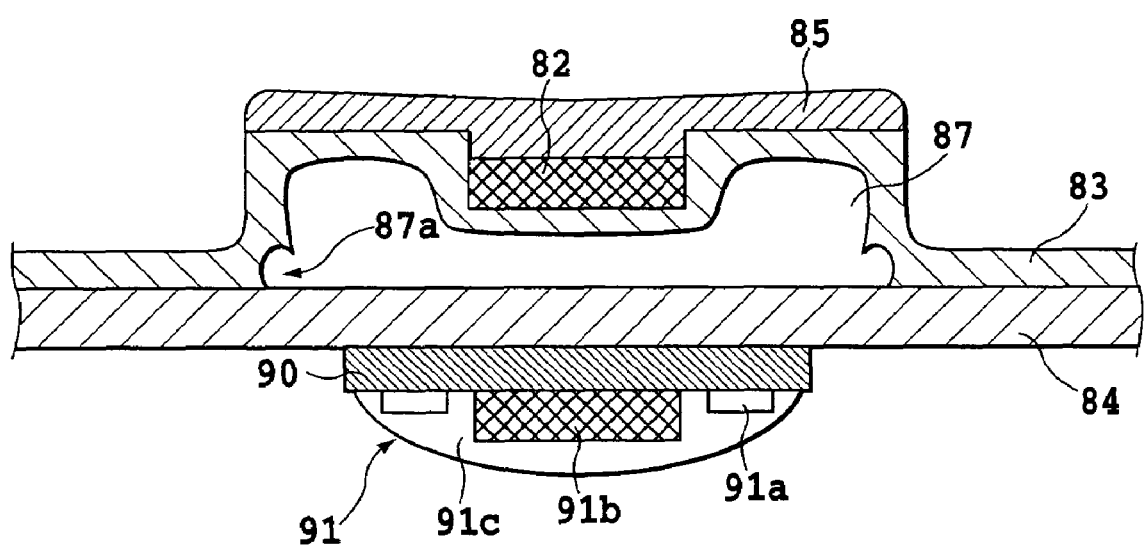
FIG. 17 is a cross-sectional view showing a structure of an embodiment of the pointing device using the magnetic sensor array in accordance with the present invention.

FIG. 17 is a cross-sectional view showing a structure of an embodiment of the pointing device using the magnetic sensor array in accordance with the present invention. In FIG. 17, the reference numeral 82 designates a magnet, 83 designates a silicone resin as an elastic member, 84 designates a printed circuit board, 85 designates a pushing member, 87 designates a hollow and 87a designates a undercut. A magnetic sensor array 91 includes bare chips 91a of the Hall effect devices placed on the diagonals of a square; and a magnet 91b placed at the center and glued to a surface of the ceramic printed circuit board 90 with a resin. The bare chips 91a and magnet 91b are coated with an epoxy resin 91c by potting. The magnet 82 is magnetized in the vertical direction.

When a user displaces the silicone resin 83 placed in a plane parallel to the printed circuit board 84, the silicone resin 83 sways on the fulcrum at the edge of the undercut 87a, in conjunction with which the magnet 82 sways in the same manner.

Thus, the pointing device in accordance with the present invention is configured such that it comprises the plurality of the magnetic sensor array 91 placed on the printed circuit board 84; the elastic member 83 including the hollow 87 mounted on the printed circuit board 84 to enable the sway in a desired direction; and the magnet 82 mounted on the elastic member 83, and that the plurality of magnetic sensor array 91 detect the magnetic flux density changes caused by the slide of the magnet 82 due to in the elastic deformation of the elastic member 83, thereby outputting the coordinate information or vector information.

The magnet 82 is swayable in the horizontal direction, and is displaceable in the direction perpendicular to the printed circuit board 84, thereby providing flexibility enabling the magnet 82 to move in the horizontal and vertical directions with respect to the printed circuit board 84.

The elastic member 83 has a bend and the notch 87a formed in the bend to facilitate the swayability of the magnet 82. It is preferable that the notch 87a have a shape of a U grooved undercut, and the depth of the U grooved undercut be less than the thickness of the elastic member 83. In addition, the notch can have one of the shapes of the chamfer, rounding and W grooved undercut.

The pushing member 85 is preferably made of a rigid material to prevent the magnet 82 from being shaken or hollowed or displaced when pressed by a finger. In particular, to reduce the intensity of the leakage magnetic field leakage outside, such a structure is possible that uses a non-magnetic material as the pushing member, and separates the magnet from the pushing member surface, or conversely that uses a ferro magnetic material with a high permeability to provide a magnetic shield at the same time. For example, the pushing member 85 can be made of polycarbonate, or one of metals such as aluminum alloys, nickel-iron alloys such as permalloys and pure iron.

As the magnetic detecting circuit, the conventional circuit as shown in FIG. 4 is applicable. It is also possible to use the magnetoresistive elements disclosed in the foregoing Japanese patent Application publication No.7-117876 (1995).

According to such a configuration, the pointing device is constructed such that the magnet 82 opposes the magnet 91b of the magnetic sensor array fixed to the printed circuit board 84 so that the magnets 91b and 82 attract each other by the magnetic force, thereby being automatically aligned to the initial position. This simplifies the alignment in the assembly. More specifically, since the magnetization direction of the magnet 82 of the pointing device is set to exert the attractive force between them when the magnet 82 is placed closed to the magnet 91b of the magnetic sensor array, they rest at the position where the distance between them is minimum. Consequently, the relative position between the magnet of the pointing device and that of the magnetic sensor array is set automatically. In this case, it is preferable that their opposing faces have the same geometry and size.

Figure 18A:
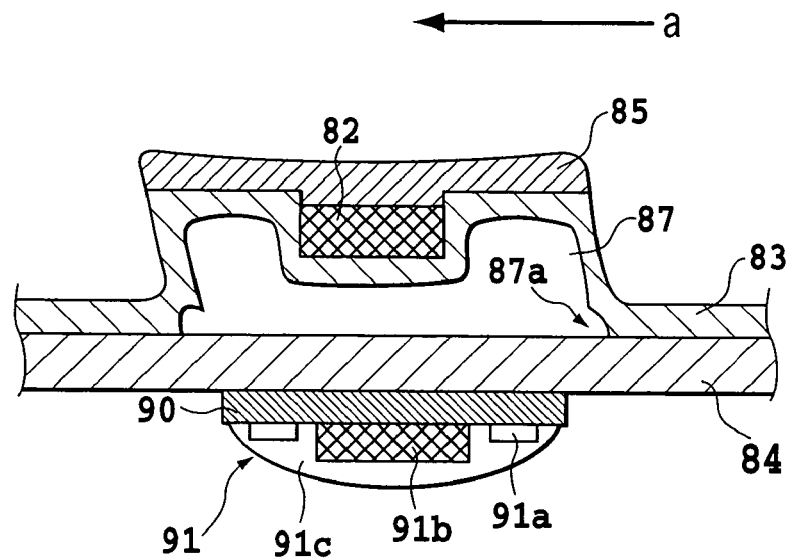
FIGS. 18A and 18B are cross-sectional views illustrating operability of the pointing device in accordance with the present invention.
Figure 18B:
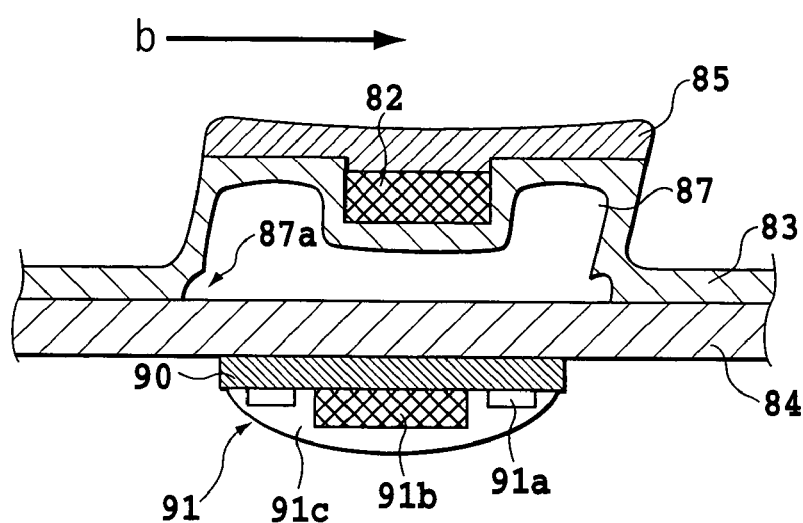

As for the pointing device thus built, being depressed in the direction of the arrow a as illustrated in FIG. 18A, that is, from right to left, the pushing member 85 moves in the left direction on the fulcrum at the coupling end of the elastic member 83 and the printed circuit board 84. On the contrary, being pushed in the direction of the arrow b as illustrated in FIG. 18B, that is, from left to right, the pushing member 85 moves in the right direction on the fulcrum at the coupling end of the elastic member 83 and the printed circuit board 84. Thus, the magnet 82 mounted on the elastic member 83 is freely swayable. The manipulation is carried out with the pad of the index finger or that of the thumb. In this case, considering the fitness with the finger pad, the top surface of the pushing member 85 is preferably one of a roughened surface, concave surface, convex surface, convex quadrilateral pyramid and concave quadrilateral pyramid. In addition, the pushing member 85 can have a plane view of one of the circle, square, rectangle, octagon, ellipse and gear-like shape.

Figure 19:
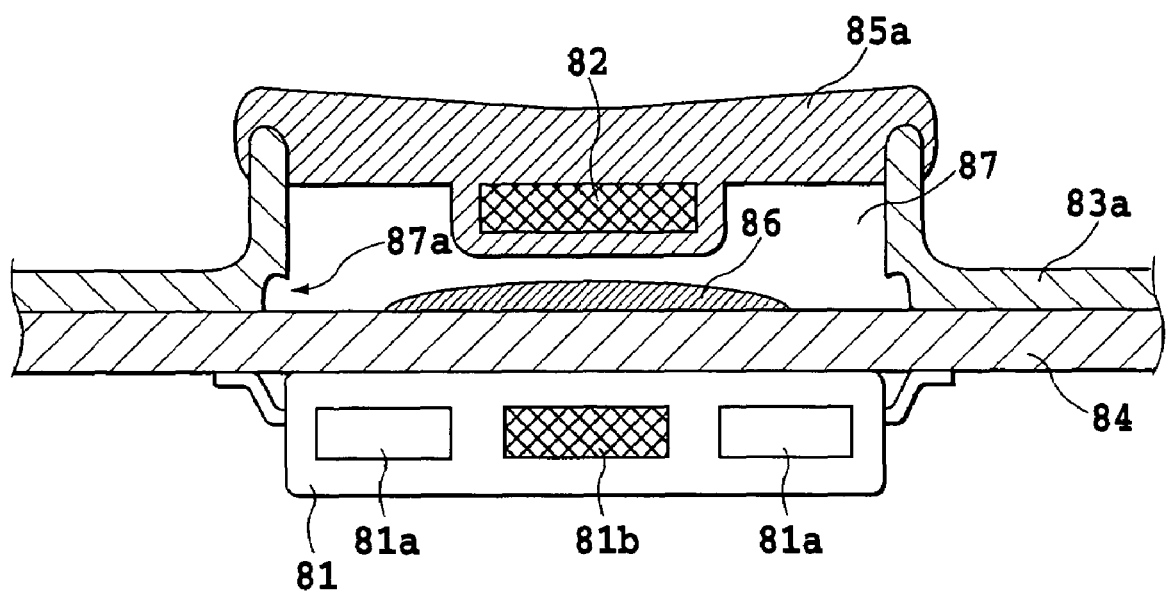
FIG. 19 is a cross-sectional view showing a structure of another embodiment of the pointing device in accordance with the present invention.

FIG. 19 is a cross-sectional view showing a structure of another embodiment of the pointing device in accordance with the present invention. Although the magnet 82 is fixed to the elastic member 83 in FIG. 17, this is not essential. For example, as shown in FIG. 19, the magnet 82 can be fixed to the pushing member 85a, a nonelastic member constituting the hollow 87 together with the elastic member 83a.

In the hollow 87, the switch 86 is mounted on the printed circuit board 84 to provide the pointing device with the switch function. As the switch 86, a tactile switch is suitable that enables a user to confirm the depression (with providing a feeling of a click) and automatically returns to the normal position after pushing the switch.

Figure 20:
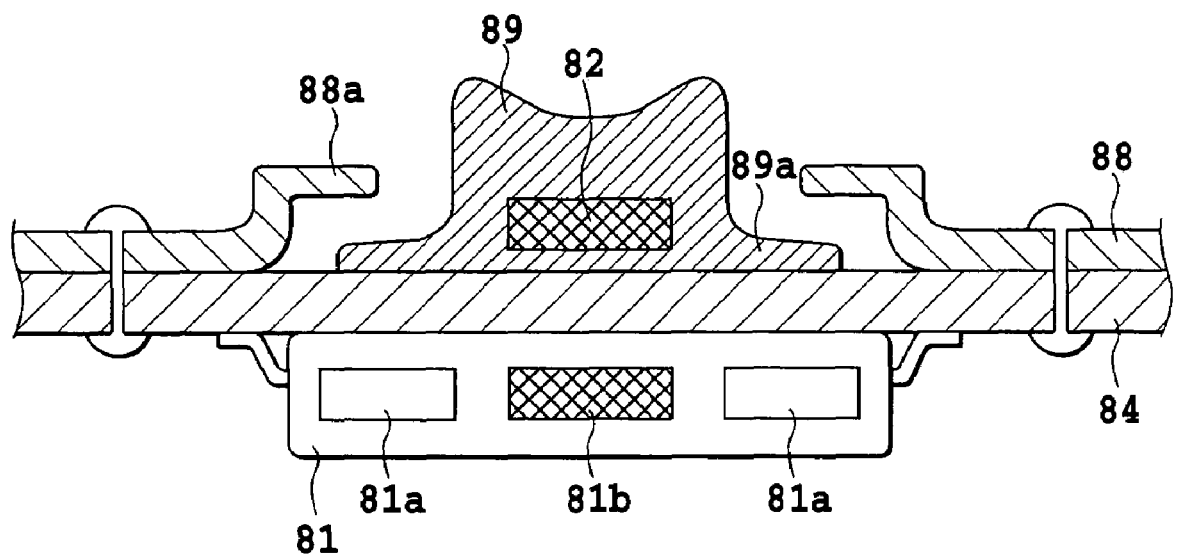
FIG. 20 is a cross-sectional view showing a structure of still another embodiment of the pointing device in accordance with the present invention.

FIG. 20 is a cross-sectional view showing a structure of still another embodiment of the pointing device in accordance with the present invention. In FIG. 20, the reference numeral 88 designates a covering member, and 89 designates an manipulation member including the magnet 82. To prevent the manipulation member 89 from dropping off, the covering member 88 has a collar 88a for holding down a flange 89a at the bottom of the manipulation member 89. The covering member 88 is fastened to the printed circuit board 84 with fixing pins. Incidentally, the present embodiment does not include the switch 86.

According to such a configuration, the pointing device is constructed such that the magnet 82 opposes the magnet 81b of the magnetic sensor array fixed to the printed circuit board 84 as described above so that the magnets 81b and 82 attract each other by the magnetic force, thereby being automatically aligned to the initial position. This simplifies the alignment in the assembly. In addition, a small amount of displacement is automatically corrected by the slide of the manipulation member.

Figure 21:
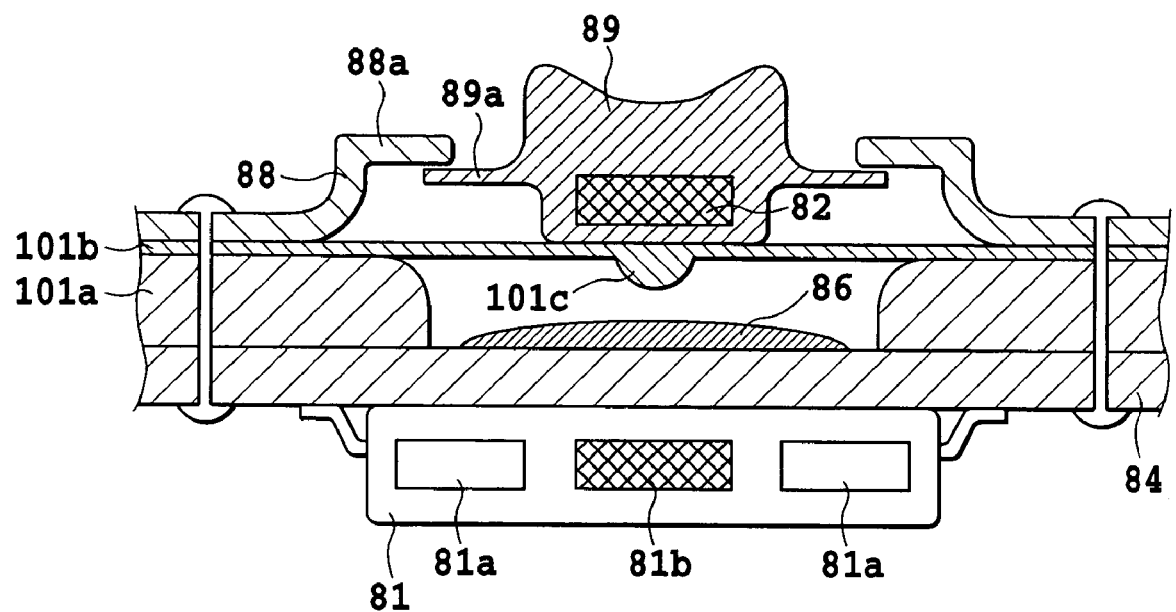
FIG. 21 is a cross-sectional view showing a structure of still another embodiment of the pointing device in accordance with the present invention.

FIG. 21 is a cross-sectional view showing a structure of still another embodiment of the pointing device in accordance with the present invention. In FIG. 21, the reference numeral 101a designates a spacer in which a hollow for containing the switch 86 is formed; and 101b designates an elastic plate placed on the spacer 101a. The elastic plate has a protrusion 101c for pushing the switch 86.

On the elastic plate 101b, the manipulation member 89 and covering member 88 are provided as shown in FIG. 20 in such a manner that the collar 88a of the covering member holds down the flange 89a of the manipulation member 89. The printed circuit board 84, spacer 101a, elastic plate 101b and the covering member 88 are fastened with fixing pins.

Next, a prototype in accordance with the present invention will be described.

The pointing device with the structure as shown in FIG. 17 was built as a prototype. As the magnetic sensor array, four Hall effect devices, HQ-106C (trade name), manufactured by Asahi Kasei Electronics Co., Ltd. were used. On the ceramic printed circuit board, the four bare chips (0.4 mm×0.4 mm) of the Hall effect devices, HQ-106C, were placed at diagonal positions of a square with a side of 2.6 mm, to be attached by the flip chip bonding. At the center of the four Hall effect devices, a neodymium group magnet 2 mm in diameter and 0.5 mm in thickness was glued to a ceramic printed circuit board with a resin, followed by coating them by potting an epoxy resin on the Hall effect devices and magnet. The magnetization direction of the magnet 62 is in the vertical direction, and had a bipolar structure with its top end being a north pole and bottom end being a south pole.

As the printed circuit board 84, a 0.6 mm thick glass epoxy board was used. The silicone resin 83 was 0.2-0.5 mm in thickness. As for the rubber hardness, although it must be determined in accordance with the designed thickness, it is preferable that the standard rubber hardness be about 30-80. As the switch 86, a 0.15 mm thick tactile switch was employed. The thickness from the top surface of the printed circuit board 84 to the top surface of the pushing member 85 was less than 2 mm, and the pushing member was made 6.4 mm in diameter.

Figure 22:
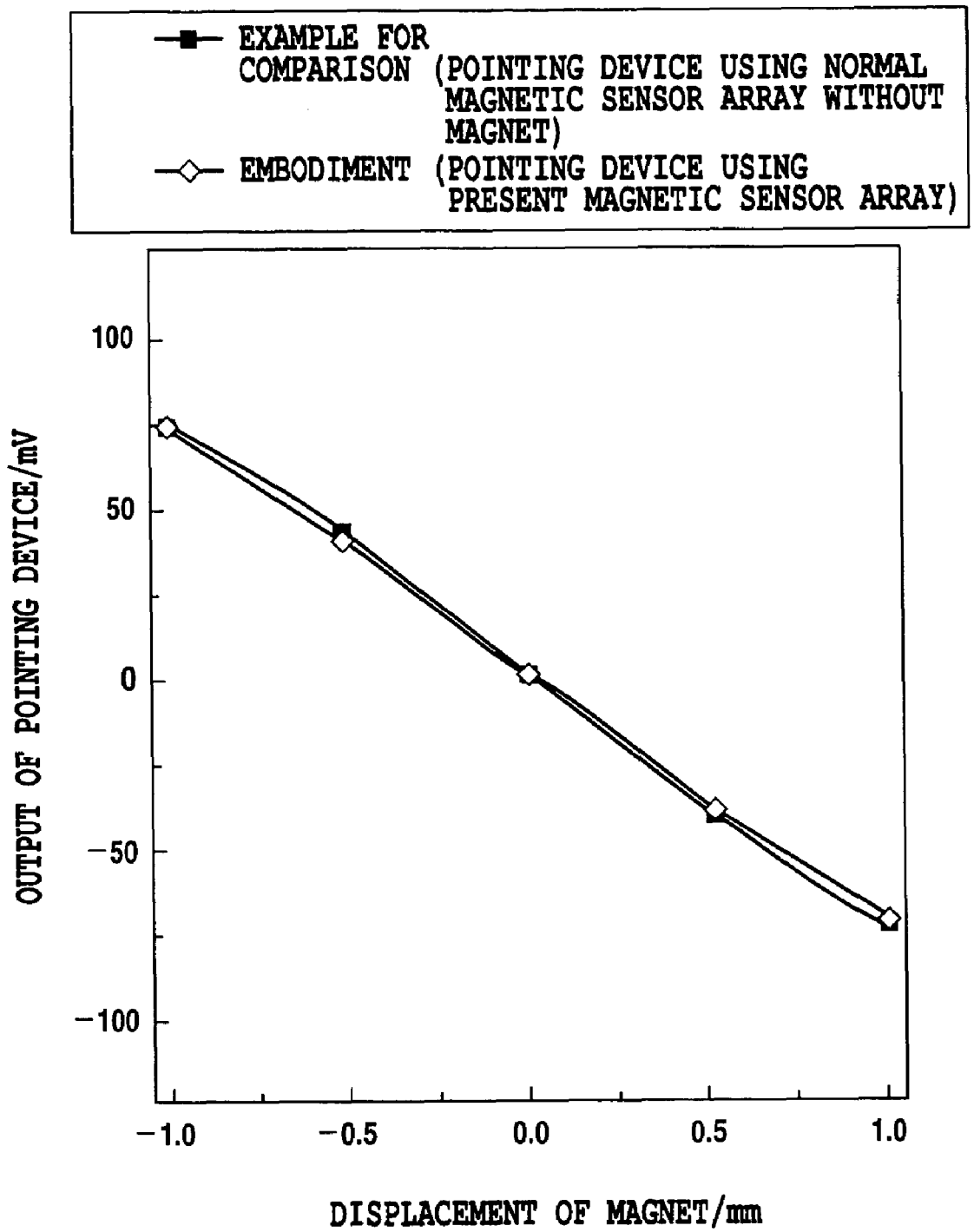
FIG. 22 is a graph illustrating outputs from the Hall effect device array in accordance with the present invention (an embodiment) and outputs from an ordinary Hall effect device array without including a magnet (example for comparison)
Figure 23:
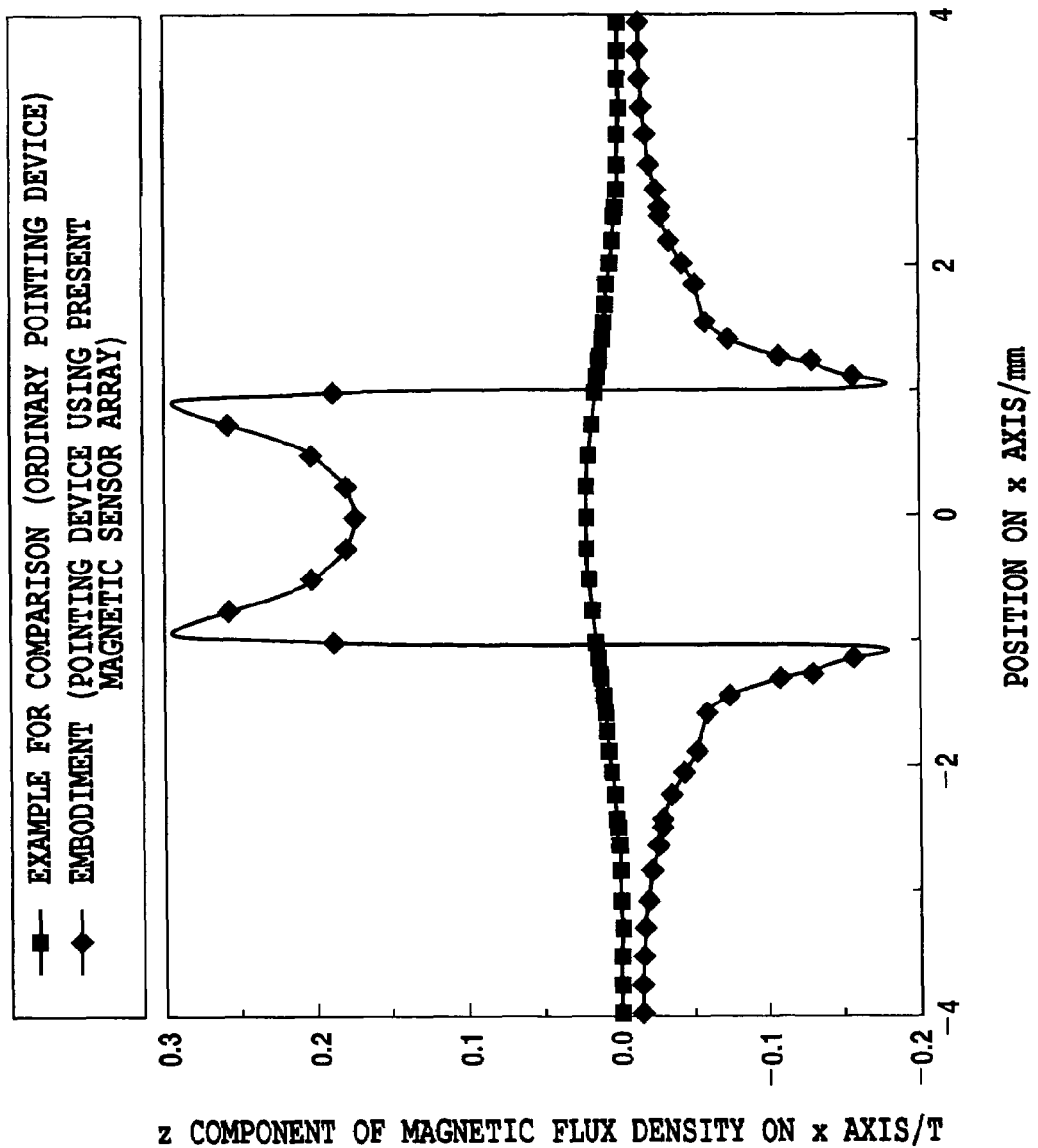
FIG. 23 is a graph illustrating the Z component (magneto-sensitive axis direction component) of the magnetic flux density on the X axis on the magneto-sensitive plane of Hall effect devices.

FIGS. 22-26 are graphs illustrating output characteristics of the pointing device in accordance with the present invention and magnetic flux density near the magnetic sensor array: FIG. 22 is a graph illustrating outputs (indicated by open diamonds) from the Hall effect device array in accordance with the present invention (an embodiment) and outputs (indicated by solid squares) from an ordinary Hall effect device array without including a magnet (example for comparison). FIG. 23 is a graph illustrating the Z component (magneto-sensitive axis direction component) of the magnetic flux density against the position on the X axis on the magneto-sensitive plane of the Hall effect devices, in which solid squares represent the magnetic flux density at reference positions caused by the magnet of the example for comparison (ordinary pointing device), and solid diamonds represent that of the embodiment of the pointing device (using the magnetic sensor array in accordance with the present invention).

Figure 24:
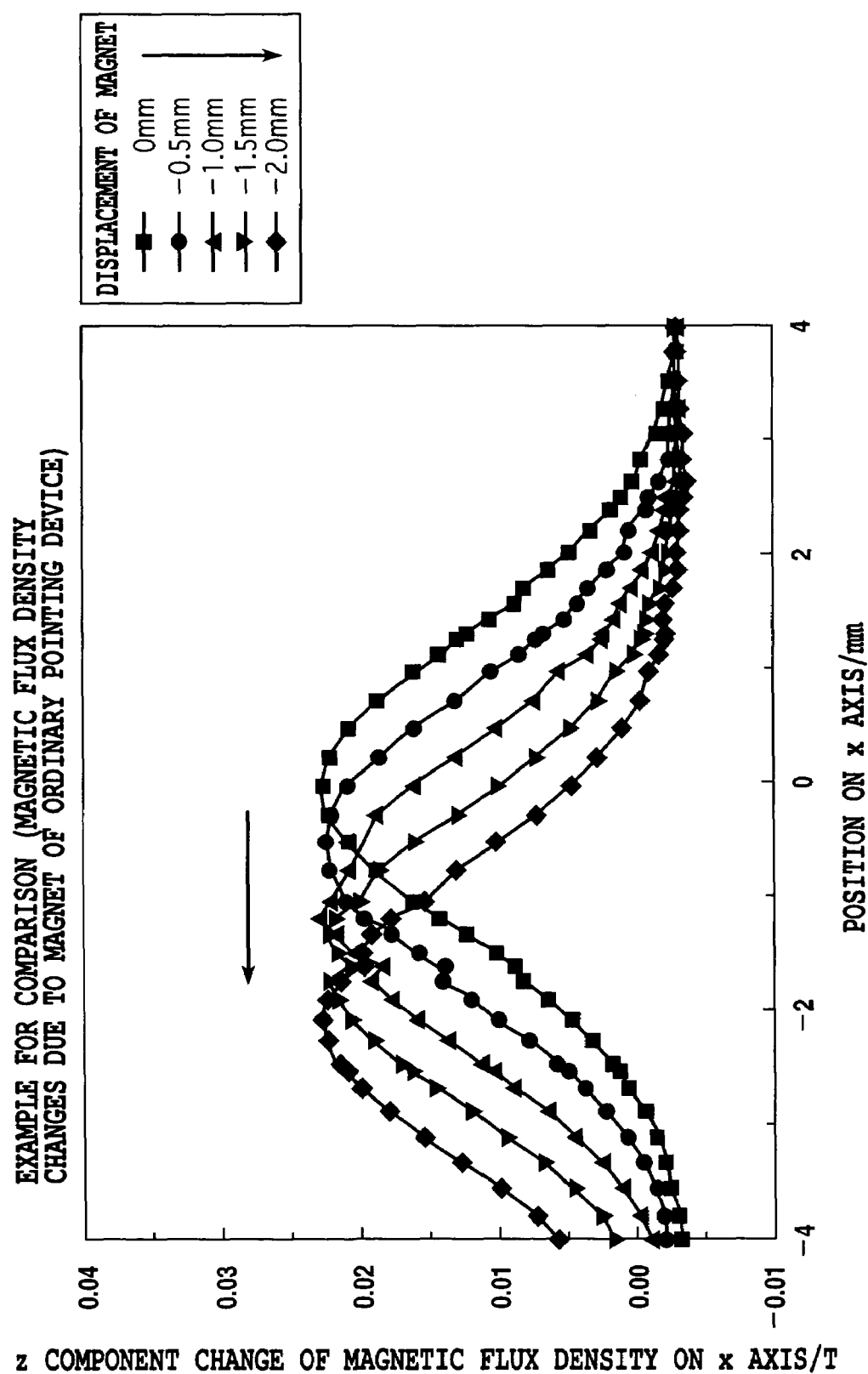
FIG. 24 is a graph illustrating changes in the Z component of the magnetic flux density when the magnet of the pointing device is displaced in the X axis direction with respect to the example for comparison of FIG. 23.
Figure 25:
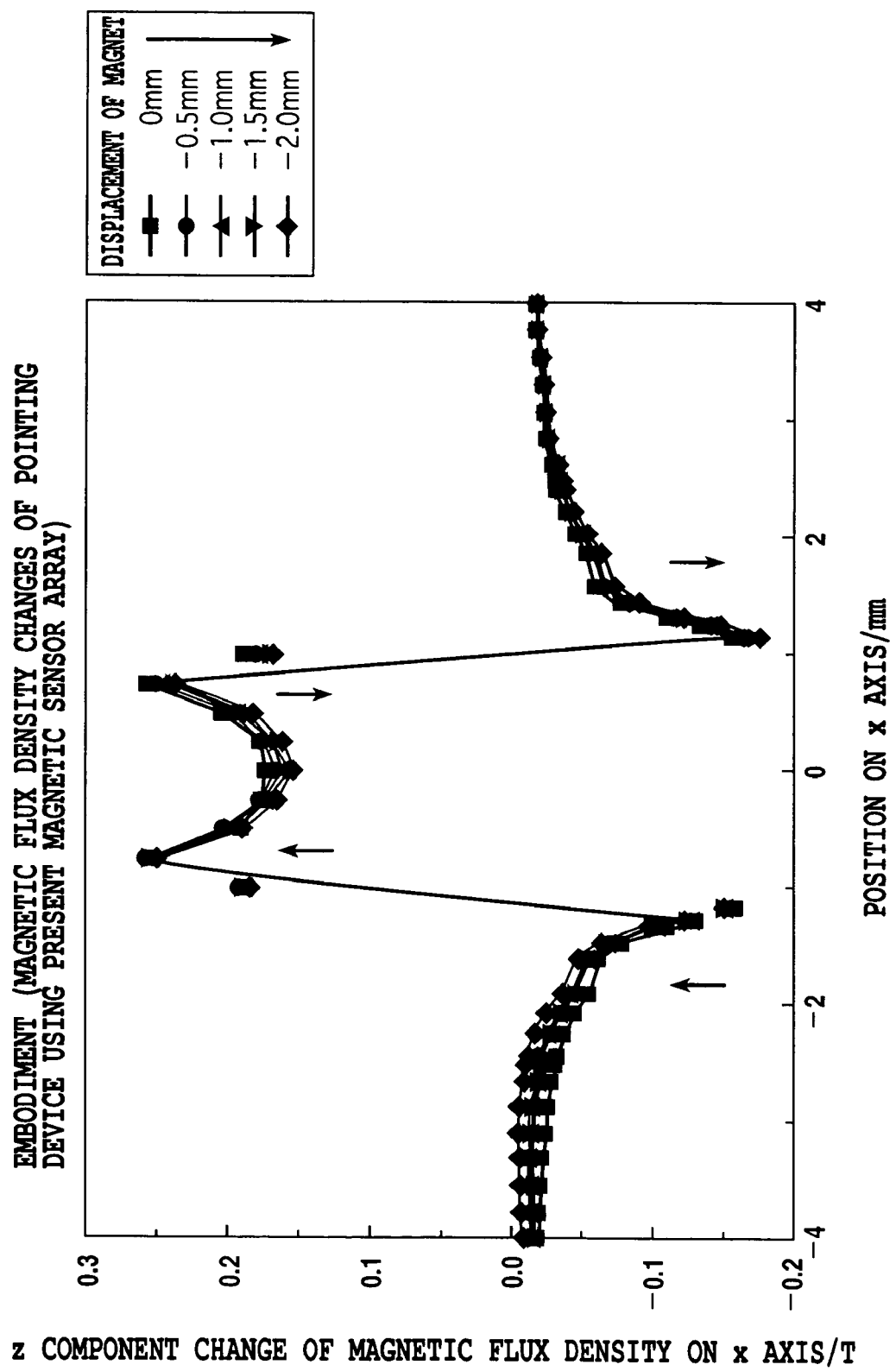
FIG. 25 is a graph illustrating changes in the Z component of the magnetic flux density when the magnet of the pointing device is displaced in the X axis direction as in FIG. 24 with respect to the embodiment of FIG. 23.
Figure 26:
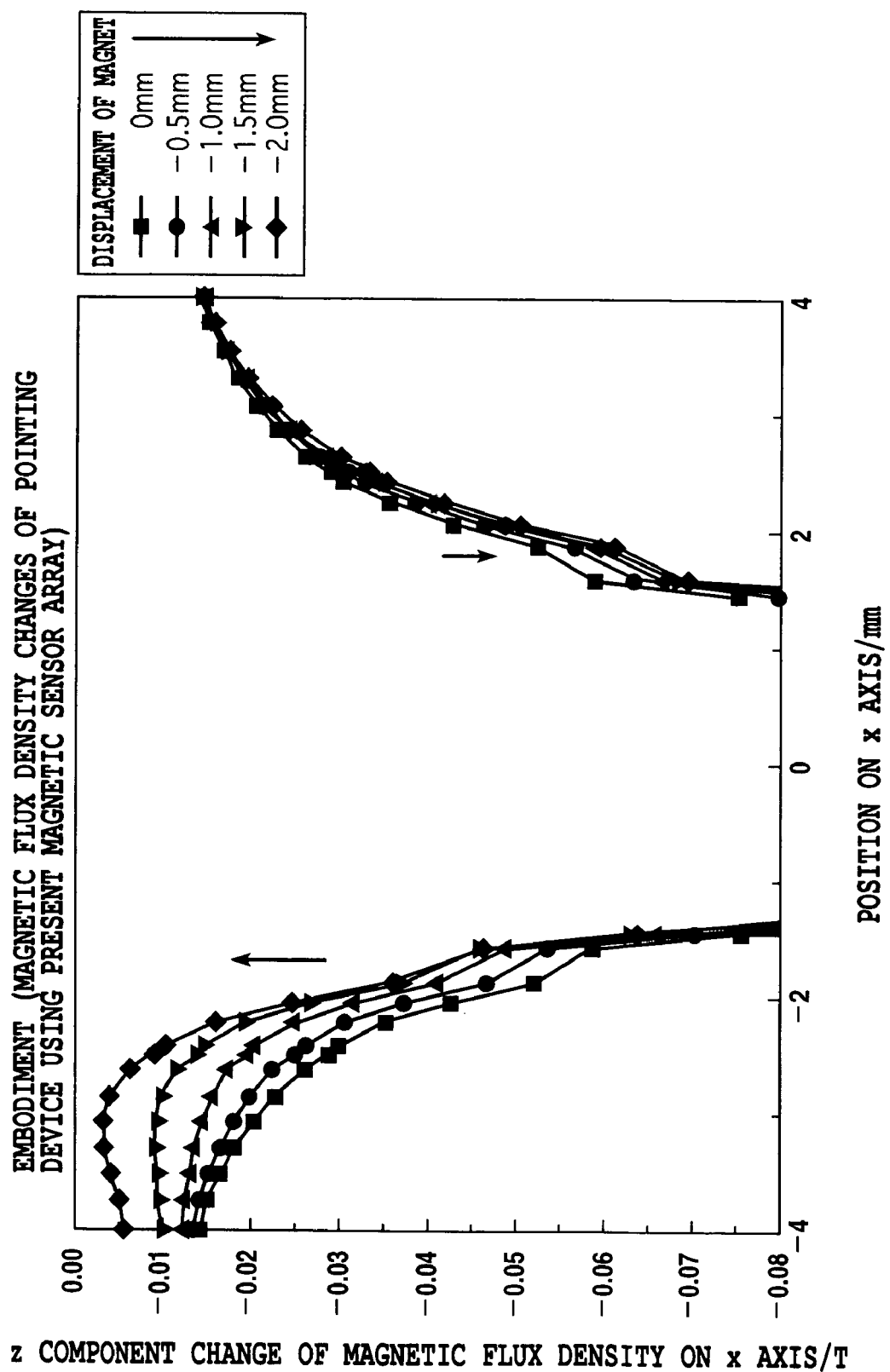
FIG. 26 is an enlarged diagram of FIG. 25.

FIG. 24 is a graph illustrating changes in the Z component of the magnetic flux density when the magnet of the pointing device is displaced in the X axis direction in the example for comparison of FIG. 23; and FIG. 25 is a graph illustrating changes in the Z component of the magnetic flux density when the magnet of the pointing device is displaced in the X axis direction as in FIG. 24 in the embodiment of FIG. 23. FIG. 26 is an enlarged diagram of FIG. 25;

As described above, according to the present invention, the magnetic sensor array used for the pointing device, which has the plurality of magnetic sensors disposed in specified arrangement on the printed circuit board to detect the magnetic flux density changes and to supply the coordinate information or vector information, is configured such that it includes the magnet placed at the specified position with respect to the plurality of magnetic sensors. Thus, the magnetic sensor array can automatically align the initial position of the magnet used for the position input of the pointing device. As a result, using the magnetic sensor array and the magnetic sensors makes it possible to provide a high degree of ease of use to the pointing device which has a thin-walled structure and hence enables a large output using a magnet with a small magnetic force.

Figure 27:
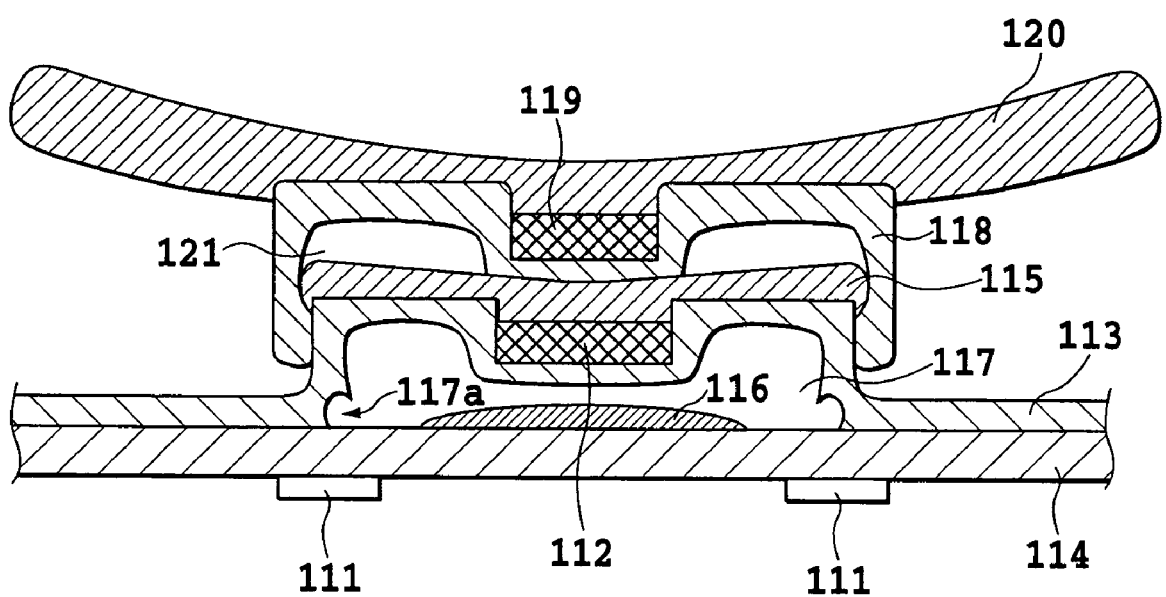
FIG. 27 is a cross-sectional view showing a structure of an embodiment of the pointing device and manipulation adapter in accordance with the present invention.

FIG. 27 is a cross-sectional view showing a structure of an embodiment of the pointing device and manipulation adapter in accordance with the present invention. In FIG. 27, the reference numerals 111 designate magnetic sensors. The reference numeral 112 designates a first magnet, 113 designates a silicone resin as a first elastic member, 114 designates a printed circuit board, 115 designates a pushing member, 116 designates a switch, 117 designates a first hollow, 117a designates an undercut, 118 designates a silicone resin as a second elastic member, 119 designates a second magnet, 120 designates a manipulation member and 121 designates a second hollow.

As described before, the magnetic sensors 111 are placed symmetrically two by two along the X axis and Y axis on the printed circuit board 114. The magnet 112 is magnetized in the vertical direction.

When a user displaces the silicone resin 113 in a plane parallel to the printed circuit board 114, the silicone resin 113 sways on the fulcrum at the bottom of the undercut 117a, in conjunction with which the magnet 112 sways in the same manner.

The manipulation adapter, which is fitted to the pushing member 115 of the pointing device, is composed of the elastic member 118 constituting the hollow 121 enabling the adapter to be swayed in any direction, the manipulation member 120 mounted on the elastic member 118, and the magnet 119 which is fitted (embedded) into the elastic member 118 in such a manner that it projects toward the second hollow 121.

When the second magnet 119 magnetized in the same direction as the first magnet 112 is fitted into the adapter, it must be placed such that it exerts attractive powers on the magnet 112 of the pointing device. More specifically, when the magnet is cylindrical, the magnet 119 magnetized in the direction of the hight such as S-N or N-S must be placed in such a manner that it exerts attractive powers on the magnet 112 of the pointing device such as S-N/S-N or N-S/N-S.

With such an arrangement, a user displaces the silicone resin 118 fitted to the pushing member 115 in a plane parallel to the printed circuit board 114 by manipulating the manipulation member 120. Then, the silicone resin 118 sways, and the magnet 112 moves in the same manner.

As described above, the pointing device in accordance with the present invention is configured such that it comprises the plurality of magnetic sensors 111 placed on the printed circuit board 114; the elastic member 113 placed on the printed circuit board 114 and including the hollow 117 for enabling the pushing member to sway in a desired direction; the magnet 112 attached to the elastic member 113; the pushing member 115 mounted on the top surface of the first elastic member; the second elastic member 118 fitted to the pushing member 115 and including the second hollow 121 for enabling the sway in a given direction; and the manipulation member 120 mounted on the second elastic member 118, and that the plurality of magnetic sensors 111 detect the magnetic flux density changes caused by the displacement of the magnets 112 and 119 due to the elastic deformation of the elastic members 113 and 118, and output the coordinate information or vector information.

The magnets 112 and 119 are freely swayable in the horizontal direction as described above. In addition, they are displaceable in the direction perpendicular to the printed circuit board 114. Thus, they have the flexibility in moving in both the horizontal and vertical directions with respect to the printed circuit board 114.

Furthermore, the elastic member 113 has the bend in which the undercut 117a is formed in order to facilitate the sway of the magnet 112. As for the shape of the notch, a U groove is preferable, the depth of which must be smaller than the thickness of the elastic member 113. The shape of the notch can be one of a chamfer, rounding and W groove.

In the hollow 117, the switch 116 is mounted on the printed circuit board 114 to provide the pointing device with the switch function. As the switch 116, a tactile switch is suitable that enables a user to confirm the depression (with providing a feeling of a click) and automatically returns to the normal position after pushing the switch as described above.

The pushing member 115 is preferably made of a rigid material to prevent the magnet 112 from being shaken or from being hollowed or displaced when pressed by a finger. In particular, to reduce the intensity of the leakage magnetic field leakage outside, such a structure is possible that uses a non-magnetic material as the pushing member, and separates the magnet from the pushing member surface, or conversely that uses a ferro magnetic material with a high permeability to provide a magnetic shield at the same time. For example, the pushing member 115 can be made of polycarbonate, or one of metals such as aluminum alloys, nickel-iron alloys such as permalloys and pure iron.

As the magnetic detecting circuit, the conventional circuit as shown in FIG. 4 is applicable. It is also possible to use the magnetoresistive elements disclosed in the foregoing Japanese patent Application publication No.7-117876 (1995).

Figure 28A:
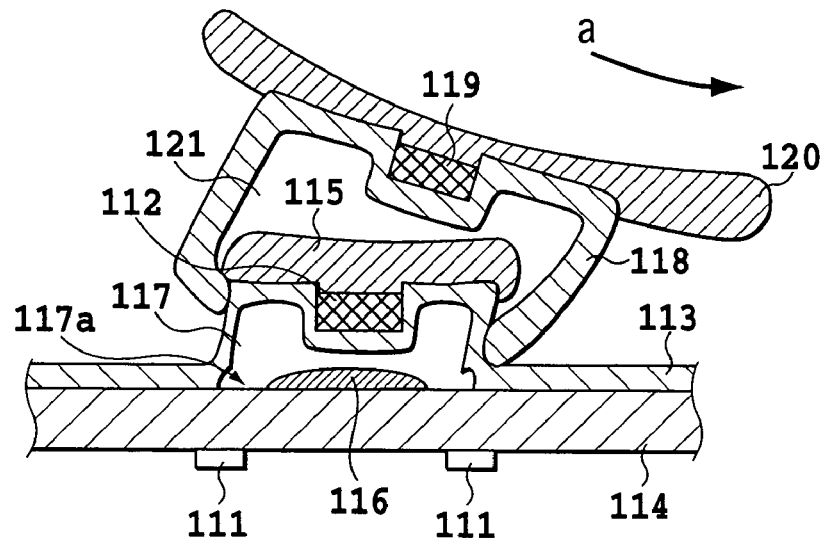
FIGS. 28A and 28B are cross-sectional views showing operability of the pointing device in accordance with the present invention.
Figure 28B:
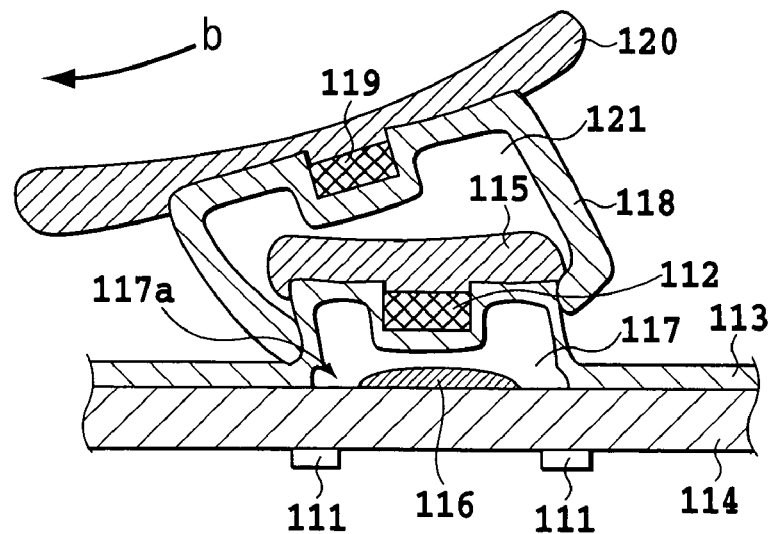

With the foregoing structure, being pushed in the direction of the arrow a as illustrated in FIG. 28A, that is, from left to right, the manipulation member 120 moves together with the elastic member 118 in the right direction on the fulcrum at the coupling end of the elastic member 113 and the printed circuit board 114. On the contrary, being pushed in the direction of the arrow b as illustrated in FIG. 28B, that is, from right to left, the manipulation member 120 moves together with the elastic member 118 in the left direction on the fulcrum at the coupling end of the elastic member 113 and the printed circuit board 114. Thus, the magnets 112 and 119 fixed to the elastic members 113 and 118 are freely swayable. The manipulation is carried out with the pad of the index finger or that of the thumb. In this case, considering the fitness with the finger pad, the top surface of the manipulation member 120 is preferably one of a roughened surface, concave surface, convex surface, convex quadrilateral pyramid and concave quadrilateral pyramid. In addition, the pushing member 115 can have a plane view of one of the circle, square, rectangle, octagon, ellipse and gear-like shape, and the shape of the manipulation member 120 can be fixed considering the shape of pushing member 115.

Thus attaching the adapter enables the user to have a positive manipulation feeling involved in a large movement. In addition, the magnet 119 of the adapter with a larger displacement offers an advantage of being able to increase the sensitivity of the pointing device because it can increase the magnetic flux changes at the magnetic sensors. Furthermore, it offers an advantage of being able to automatically determine the initial position of the pointing device and the adapter more accurately by the magnetic forces between the magnets 112 and 119.

Incidentally, the adapter composed of the elastic member 118 and manipulation member is detachably mounted on the pushing member 115 in order to obtain a larger displacement considering the operability. It is obvious that the magnet 112 is displaceable by the sway of the pushing member 115, even when the adapter is not mounted.

Although the magnet 112 mounted on the elastic member 113 and the magnet 119 mounted on the elastic member 118 can have the same magnetic force, it is advantageous. Further it is more advantageous to set the magnetic force of the magnet 119 greater than that of the magnet 112.

Although the foregoing embodiment is described by way of example of the adapter having the magnet mounted on the elastic member 118, it is obvious that although its effect is lessened, the adapter without the magnet can improve the operability.

Figure 29:
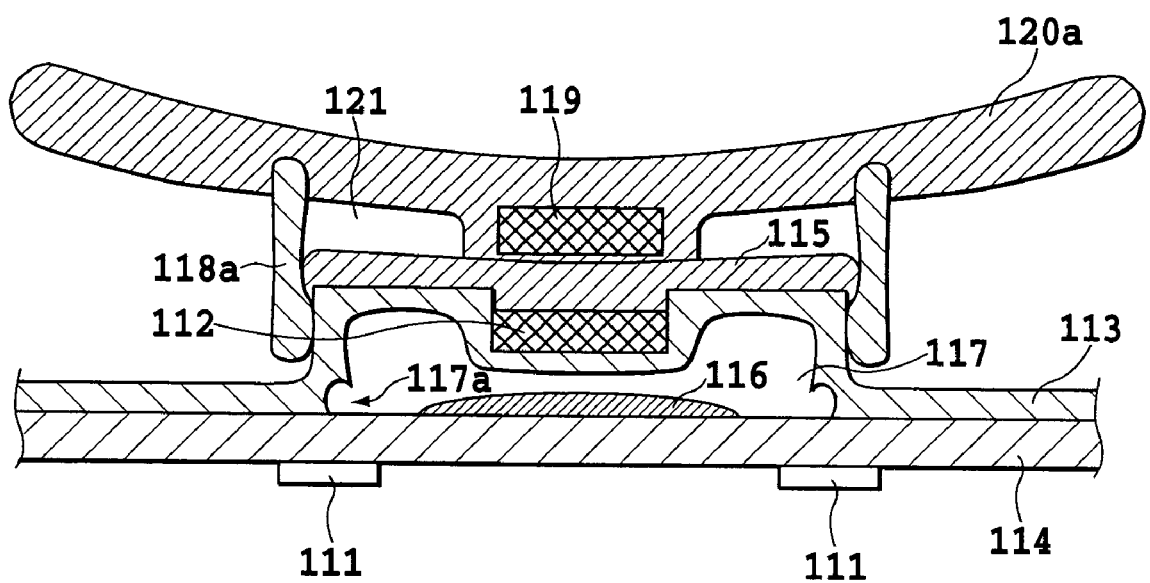
FIG. 29 is a cross-sectional view showing a structure of another embodiment of the pointing device manipulation adapter in accordance with the present invention, illustrating a state in which the adapter is mounted on the pointing device.

FIG. 29 is a cross-sectional view showing a structure of another embodiment of the pointing device in accordance with the present invention. Although the magnet 119 is mounted on the elastic member 118 in the structure as shown in FIG. 27, this is not essential. For example, the magnet 119 can be fixed to the manipulation member 120a which is a nonelastic member forming a hollow 121, together with an elastic member 118a.

Figure 30:
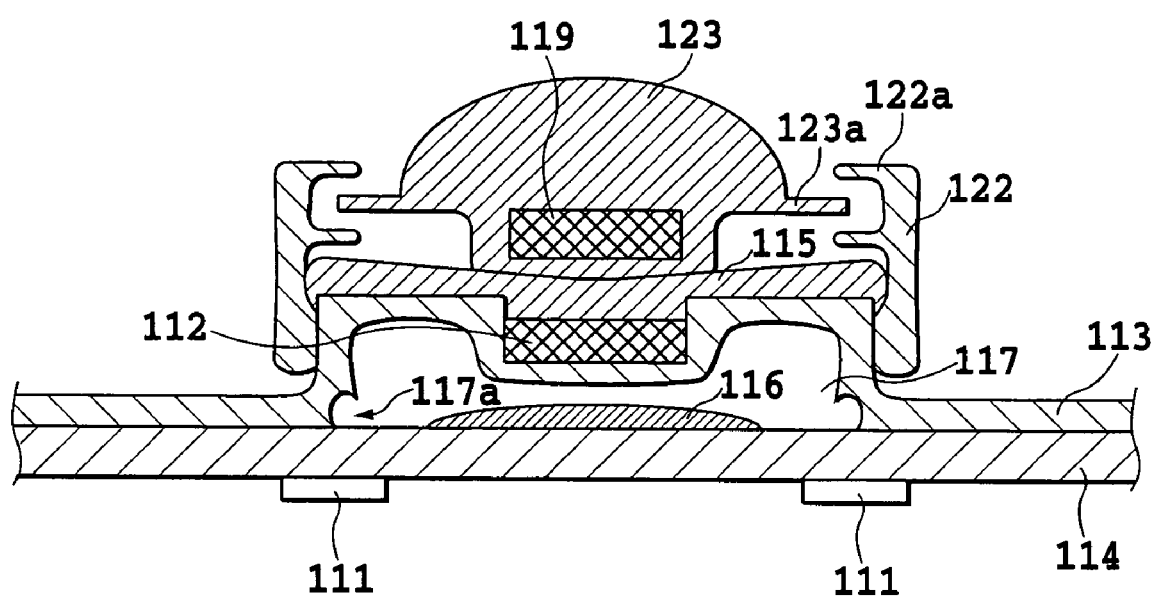
FIG. 30 is a cross-sectional view showing a structure of still another embodiment of the pointing device manipulation adapter in accordance with the present invention, illustrating a state in which the adapter is mounted on the pointing device.

FIG. 30 is a cross-sectional view showing a structure of still another embodiment of the manipulation adapter for the pointing device in accordance with the present invention, in which a manipulation member 123 is placed on the pushing member 115. The manipulation member 123 has a flange 123a and a convex bottom resting on the pushing member 115. It includes the magnet 119, and is mounted in such a manner that it is swayable in a desired direction.

A hold-down member 122 is fitted to an edge of the pushing member 115 to limit the sway of the actuator 123. It has an annular guiding member 122a placed in such a manner that it sandwiches the flange 123a of the manipulation member 123 to prevent the manipulation member 123 from dropping off when a user manipulates. In FIG. 30, the same reference numerals designate the portions having the same functions as those of FIG. 27.

In such a structure, the magnet can be displaced as shown in FIG. 28A or 28B in response to the sway of the manipulation member 123 in any desire direction within the space in the hold-down member 122 fastened to the edge of the pushing member 115. Then, the plurality of magnetic sensors detect the magnetic flux density changes caused by the sway of the magnet due to the elastic deformation of the elastic member 113, thereby outputting the vector information by calculating the displacement from the coordinate information or reference position.

Next, a prototype in accordance with the present invention will be described.

The pointing device with the structure as shown in FIG. 27 was made as a prototype. As the magnetic sensors 111, four Hall effect devices, HQ-106C (development product), manufactured by Asahi Kasei Electronics Co., Ltd. were used. The diagonal distance between the centers of the Hall effect devices was about 3.3 mm. As the magnet 112, a neodymium magnet 2 mm in diameter and 0.5 mm in thickness was used. The magnetization of the magnet 112 is in the vertical direction, and had a bipolar structure with its top end being a north pole and bottom end being a south pole.

As the printed circuit board 114, a 0.6 mm thick glass epoxy board was used. The silicone resin 113 was 0.2-0.5 mm in thickness. As for the rubber hardness, although it must be determined in accordance with the designed thickness, it is preferable that the rubber hardness be about 30-80. As the switch 116, a 0.15 mm thick tactile switch was employed. The thickness from the top surface of the printed circuit board 114 to the top surface of the pushing member 115 was less than 2 mm, and the pushing member was made 6.4 mm in diameter.

As for the sizes of the manipulation member 120 and 120a in FIGS. 27 and 29, although they are not limited in particular, they are preferably 10-20 mm in diameter because the manipulation member are easy to manipulate when their sizes are adjusted to the tip of the finger. As for the height of the adapter, about 4 mm is desirable.

As for the size of the manipulation member 123 of the adapter in FIG. 30, it is preferable that the width of the circumferential flange 123a be about 1 mm, the diameter of the convex bottom be about 3 mm, and the height be about 3 mm. In addition, it is desirable that the gap between the hold-down member 122 and the manipulation member 123 be about 1 mm, and the height of the hold-down member 122 be about 3 mm.

Incidentally, the embodiments of the pointing device as shown in FIGS. 27 and 29 are characterized in that they can cope with the fine movement by physically multiplying the movement to increase the sensitivity of the pointing device. In contrast, the embodiment of the pointing device as shown in FIG. 30 is mainly characterized in that the manipulation member of the adapter can provide a user with an easy-to-move manipulation feeling.

Figure 31:
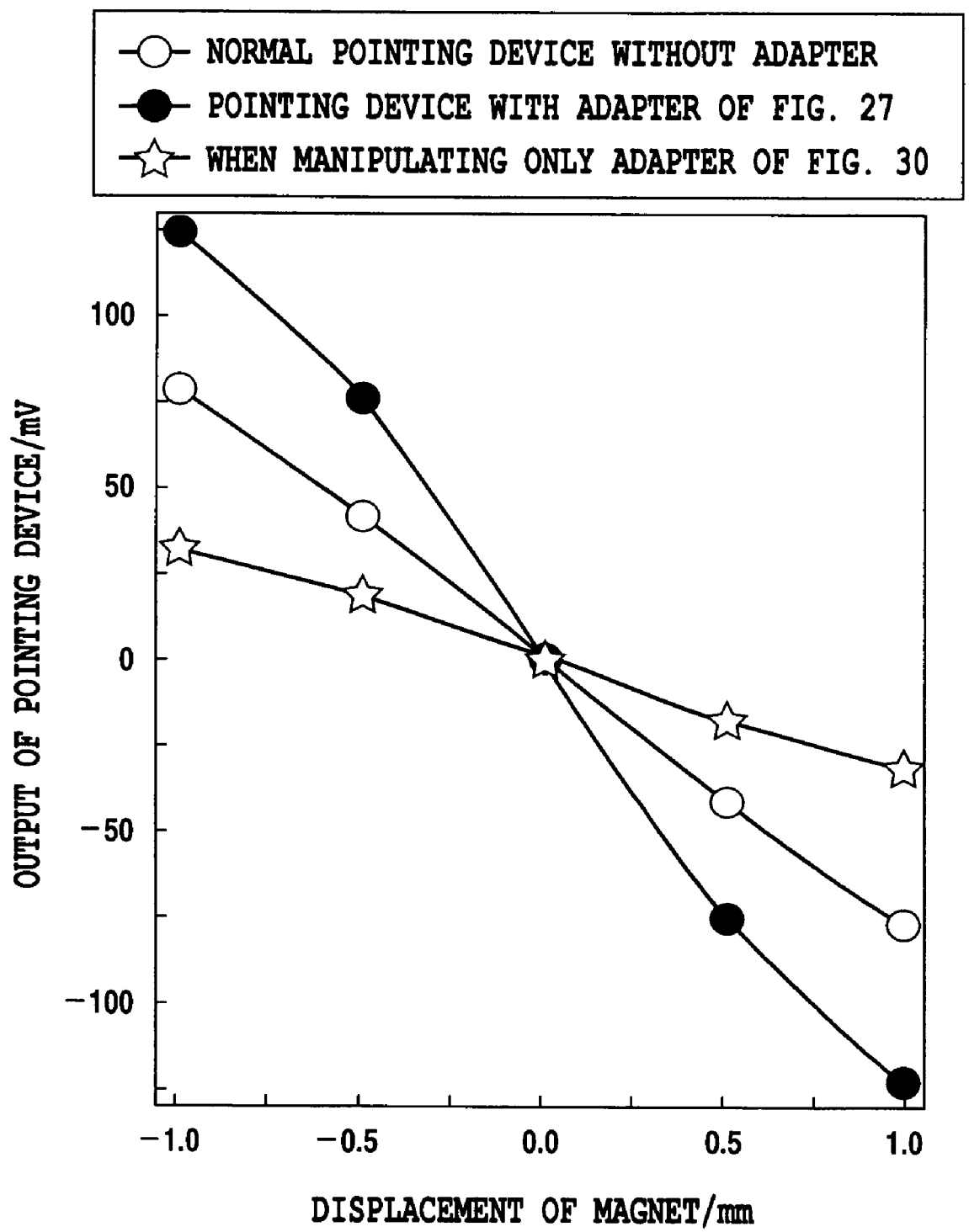
FIG. 31 is a graph illustrating relationships between the displacement of a magnet and the outputs of the pointing devices.

FIG. 31 is a graph illustrating relationships between the displacement of the magnets and the outputs of the pointing devices. In FIG. 31, the open circles indicate the case of the normal pointing device without the adapter, the solid circles indicate the case of the pointing device with the adapter of FIG. 27, and open stars indicate the case where only the adapter of FIG. 30 is manipulated. Manipulation of the pointing device with the adapter of FIG. 30 in such a manner that the adapter and the pointing device itself move simultaneously can provide the large outputs as indicated by the solid circles in FIG. 31. As is seen from the output characteristics, the outputs of the pointing device vary nearly linearly with the displacement of the magnets, which enables the practical use of the pointing devices.

As described above, the pointing device manipulation adapter in accordance with the present invention is configured such that it includes the elastic member which is fitted to the pushing member of the pointing device, and constitutes the hollow enabling the sway in any desired direction, and the manipulation member mounted on the elastic member, and that the plurality of magnetic sensors detect the magnetic flux density changes caused by the displacement of the magnet of the pointing device due to the elastic deformation of the elastic member, and outputs the coordinate information or vector information. As a result, the present invention can implement the pointing device manipulation adapter with a high degree of ease of use, which can produce the large output by using the small magnetic force magnet.

INDUSTRIAL APPLICABILITY

As described above, the pointing device in accordance with the present invention is configured such that it includes the magnet mounted on the elastic resin to produce magnetic forces, and the magnetic sensors placed on the printed circuit board, and that the magnetic sensors detect the ambient magnetic flux density changes caused about by the displacement of the magnet, thereby outputting the coordinate values of the input point. Thus, the present invention can provide the magnetic detecting type pointing device capable of reducing the number of components such as the coiled spring necessary for the conventional magnet support structure, facilitating the assembly, and achieving downsizing and prolonging the life, thereby being able to provide the pointing devices suitable for a variety of applications.

What is claimed is:

1. A pointing device comprising:
   a plurality of magnetic sensors placed on a printed circuit board;
   an elastic member mounted on said printed circuit board the elastic member having a hollow for enabling sway in any desired direction;
   a rigid pushing member placed on said elastic member; and
   a magnet mounted on said elastic member or said pushing member,
   wherein said elastic member is adapted to be deformed by an external force and to return the magnet to an initial position when the external force is removed, said hollow being enclosed by said printed circuit board, and said plurality of magnetic sensors detect magnetic flux density changes caused by a sway of said magnet due to elastic deformation of said elastic member,
   wherein said elastic member has a hollow that is made in such a manner that a portion where said magnet is placed and its neighborhood are made thinner than a remaining portion where the magnet is not placed.

2. The pointing device as claimed in claim 1, wherein said pushing member has a top whose area is greater than an area of said magnet.

3. The pointing device as claimed in claim 1, wherein said elastic member consists of a silicone resin.

4. The pointing device as claimed in claim 1, wherein said magnet and said elastic member are replaced by a rubber magnet.

5. The pointing device as claimed in claim 1, wherein said magnetic sensors are placed symmetrically along X axis and Y axis on a plane, and said magnet is disposed at about a center of said magnetic sensors.

6. The pointing device as claimed in claim 1, further comprising a switch on an elastic member side surface of said printed circuit board.

7. The pointing device as claimed in claim 6, further comprising a protrusion formed at a portion facing said switch on said elastic member, wherein said protrusion is provided for depressing said switch.

8. The pointing device as claimed in claim 6, wherein said switch is a tactile switch.

9. The pointing device as claimed in claim 1, wherein said elastic member and said magnet are glued at only a center of said magnet.

10. The pointing device as claimed in claim 1, wherein said elastic member comprises at least one projection toward said printed circuit board in said hollow.

11. The pointing device as claimed in claim 10, wherein said projection is placed near an outer edge of said hollow.

12. The pointing device as claimed in claim 1, wherein said magnet is displaceable in a direction perpendicular to said printed circuit board.

13. The pointing device as claimed in claim 1, wherein said elastic member has at least one bend that forms said hollow.

14. The pointing device as claimed in claim 13, wherein said bend includes a U grooved undercut.

15. The pointing device as claimed in claim 14, wherein said U grooved undercut has a depth less than a thickness of said elastic member.

16. The pointing device as claimed in claim 13, wherein said bend of said elastic member has a chamfer or rounding.

17. The pointing device as claimed in claim 1, to which a manipulation adapter is fitted, said manipulation adapter comprising:
 a second elastic member mounted on an edge of said elastic member or on said pushing member;
 a manipulation member mounted on said second elastic member; and
 a second magnet mounted on said second elastic member or said manipulation member.

18. The pointing device as claimed in claim 17, wherein said second elastic member includes a second hollow to enable said manipulation member to be swayed in any desired direction; and said second magnet is mounted said second hollow side.

19. The pointing device as claimed in claim 1, to which a manipulation adapter is fitted, said manipulation adapter comprising:
 a hold-down member mounted on an edge of said elastic member or on said pushing member;
 a manipulation member whose movement is restrained by said hold-down member; and
 a second magnet mounted on said manipulation member.

20. A pointing device comprising:
 a printed circuit board;
 an elastic member mounted on said printed circuit board to constitute a cavity configured to enable said elastic member to move in any desired direction;
 a magnet placed on said pushing member; and
 a plurality of magnetic sensors placed on said printed circuit board, said plurality of magnetic sensors being operable to detect magnetic flux density changes caused by movement of said magnet due to elastic deformation of said elastic member,
 wherein said elastic member and said magnet are glued at only a center of said magnet.

21. A pointing device comprising:
 a printed circuit board;
 a first elastic member mounted on said printed circuit board to constitute a first cavity for enabling movement in any desired direction;
 a pushing member placed on said first elastic member;
 a first magnet placed on said first elastic member or said pushing member;
 a plurality of magnetic sensors placed on said printed circuit board, said plurality of magnetic sensors being operable to detect magnetic flux density changes caused by movement of said magnet due to elastic deformation of said first elastic member;
 a second elastic member mounted on an edge of said first elastic member or on said pushing member, said second elastic member including a second cavity;
 a manipulation member mounted on said second elastic member; and
 a second magnet mounted on said second elastic member or said manipulation member, said second magnet being mounted on a side of the second elastic member that contains said second cavity,
 wherein said second cavity enables said manipulation member to be moved in any desired direction.

22. A pointing device comprising:
 a printed circuit board;
 an elastic member mounted on said printed circuit board to constitute a cavity configured to enable said elastic member to move in any desired direction;
 a pushing member placed on said elastic member;
 a first magnet placed on said first elastic member or said pushing member; and
 a plurality of magnetic sensors placed on said printed circuit board, said plurality of magnetic sensors being operable to detect magnetic flux density changes caused by movement of said magnet due to elastic deformation of said elastic member,
 a manipulation adapter including a hold-down member mounted on an edge of said elastic member or on said pushing member;
 a manipulation member whose movement is restrained by said hold-down member;
 and a second magnet mounted on said manipulation member.

* * * * *

UNITED STATES PATENT AND TRADEMARK OFFICE
CERTIFICATE OF CORRECTION

PATENT NO. : 7,388,574 B2  Page 1 of 1
APPLICATION NO. : 10/686565
DATED : June 17, 2008
INVENTOR(S) : Toshinori Takatsuka et al.

It is certified that error appears in the above-identified patent and that said Letters Patent is hereby corrected as shown below:

Claim 1, column 20, lines 16-17, "board the" should read --board, the--.

Claim 18, column 21, line 21, "mounted said" should read --mounted on said--.

Signed and Sealed this

Fourth Day of November, 2008

JON W. DUDAS
*Director of the United States Patent and Trademark Office*